United States Patent [19]
Shibata et al.

[11] Patent Number: 5,880,444
[45] Date of Patent: Mar. 9, 1999

[54] INTERACTIVE I/O TERMINAL

[75] Inventors: Yasuko Shibata; Kazuhiro Akutsu; Kiyotaka Awatsu; Setsuo Tsukui; Yoshiharu Hinata; Kouichi Kanamoto; Kazuo Takaku, all of Utsunomiya; Takahiro Ohtani, Kawasaki, all of Japan

[73] Assignee: Fujitsu Limited, Kawasaki, Japan

[21] Appl. No.: 826,040

[22] Filed: Mar. 28, 1997

Related U.S. Application Data

[63] Continuation of Ser. No. 515,173, Aug. 15, 1995, abandoned, which is a continuation of Ser. No. 74,679, Jun. 10, 1993, abandoned.

[30] Foreign Application Priority Data

Jun. 11, 1992 [JP] Japan ..................... 4-151943

[51] Int. Cl.⁶ .................................................. G06F 15/30
[52] U.S. Cl. .............................. 235/379; 902/8; 902/20
[58] Field of Search .......................... 235/379; 364/408; 341/23; 434/118, 307, 323; 345/173, 146, 902; 902/8, 20

[56] References Cited

U.S. PATENT DOCUMENTS

| 4,636,947 | 1/1987 | Ward | 364/200 |
|---|---|---|---|
| 4,677,565 | 6/1987 | Ogaki | 364/479 |
| 4,922,419 | 5/1990 | Ohashi | 364/408 |
| 5,010,238 | 4/1991 | Kadono | 235/379 |
| 5,276,794 | 1/1994 | Lamb, Jr. | 395/149 |

FOREIGN PATENT DOCUMENTS

| 55-20528 | 2/1980 | Japan. |
| 6-2186359 | 8/1987 | Japan. |
| 2-307189 | 12/1990 | Japan. |
| 2119993 | 11/1993 | United Kingdom. |

OTHER PUBLICATIONS

European Search Report, The Hague, 15 Nov. 1996.

Primary Examiner—Anita Pellman Gross
Assistant Examiner—Karl D. Frech
Attorney, Agent, or Firm—Staas & Halsey

[57] ABSTRACT

An interactive I/O terminal supplies information to a user and inputs information based on operations of the user in accordance with the information supplied to the user. The interactive I/O terminal includes an I/O display panel for displaying a predetermined screen having a display area on which messages are to be displayed and operation keys for outputting signals corresponding to the operation keys operated by the user; a first controller for controlling the I/O display panel so that messages are displayed on the display area in the screen formed on the I/O display panel, a second controller for controlling the I/O display panel so that the screen is maintained on the I/O display panel until operations corresponding to a plurality of messages displayed on the display area are completed, and a processing unit for performing processes corresponding to the signals supplied from the I/O display panel based on operations of the user.

22 Claims, 20 Drawing Sheets

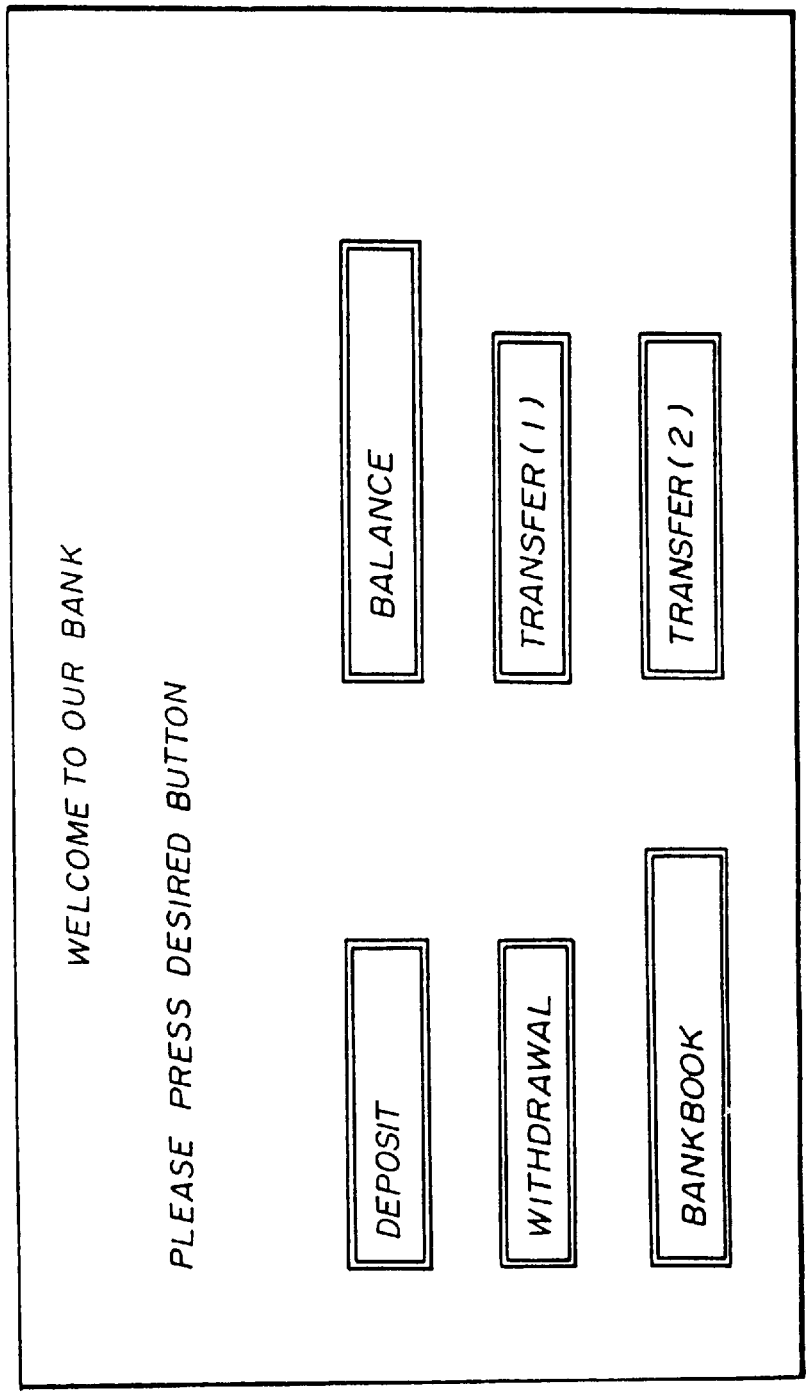

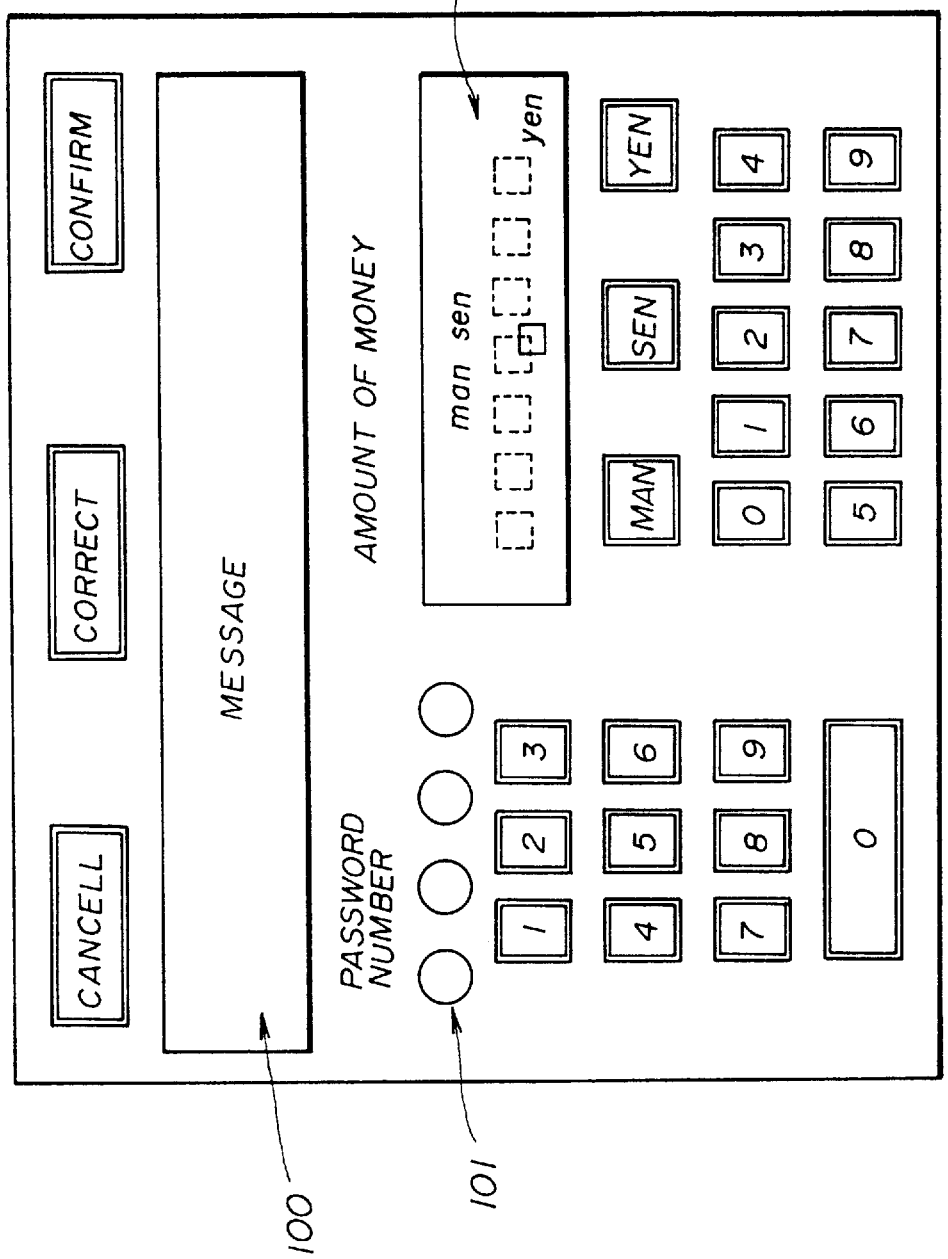

FIG. 5A

```
INSERT CARD / BANKBOOK
INPUT PASSWORD NUMBER
INPUT AMOUNT OF MONEY

PRESS "CONFIRM" KEY IF CORRECT
```

FIG. 5B

```
PASSWORD NUMBER IS INCORRECT

INPUT PASSWORD NUMBER AGAIN

PRESS "CONFIRM" KEY IF CORRECT
```

FIG. 5C

```
BALANCE IS INSUFFICIENT

INPUT AMOUNT OF MONEY AGAIN

PRESS "CONFIRM" KEY IF CORRECT
```

FIG. 5D

```
INPUT AMOUNT OF MONEY

PRESS "CONFIRM" KEY IF CORRECT
```

FIG.5E

INPUT PASSWORD NUMBER

PRESS "CONFIM" KEY IF CORRECT

FIG.5F

NO CARD IS INSERTED

INSERT CARD, AND PRESS "CONFIRM" KEY AGAIN

FIG.5G

THIS BANKBOOK DISABLE TRANSACTION

RECEIVE BANKBOOK

FIG.5H

INPUT PASSWORD NUMBER AND AMOUNT OF MONEY

PRESS "CONFIRM" KEY IF CORRECT

FIG.9A

INSERT CARD / BANKBOOK
INPUT PASSWORD NUMBER AFTER OPERATING "PASSWORD" KEY
INPUT AMOUNT OF MONEY AFTER OPERATING "AMOUNT" KEY
PRESS "CONFIRM" KEY IF CORRECT

FIG.9B

INSERT CARD/BANKBOOK
INPUT AMONT OF MONEY AFTER OPERATING "AMOUNT" KEY
PRESS "CONFIRM" KEY IF CORRECT

FIG.9C

INSERT CARD / BANKBOOK
INPUT PASSWORD NUMBER AFTER OPERATING "PASSWORD" KEY
PRESS "CONFIRM" KEY IF CORRECT

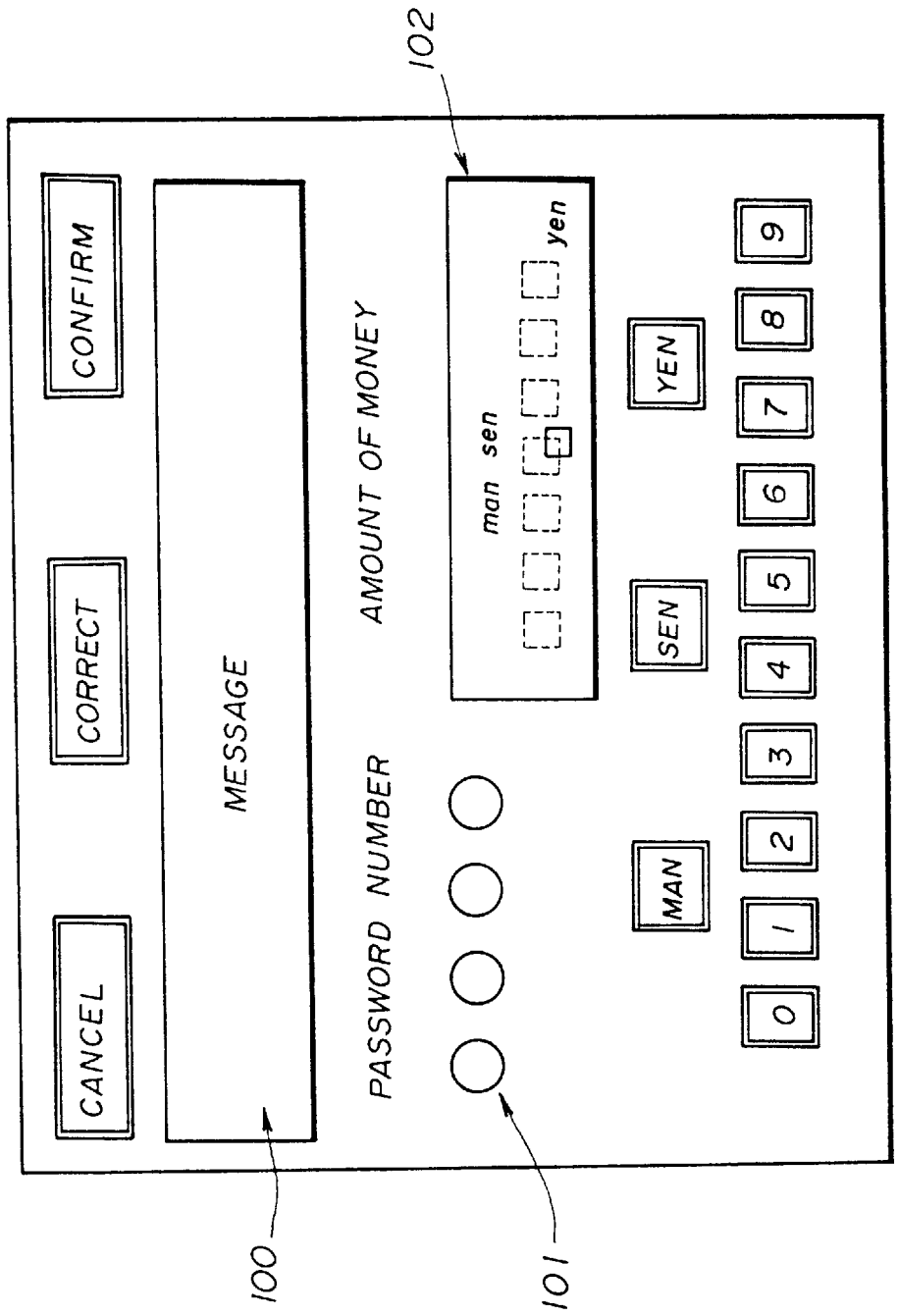

FIG. 12A

INSERT CARD AND INPUT PASSWORD NUMBER
(INSERT BANKBOOK IF YOU HAVE IT)

FIG. 12B

INPUT AMOUNT OF MONEY

PRESS "CONFIRM" IF CORRECT

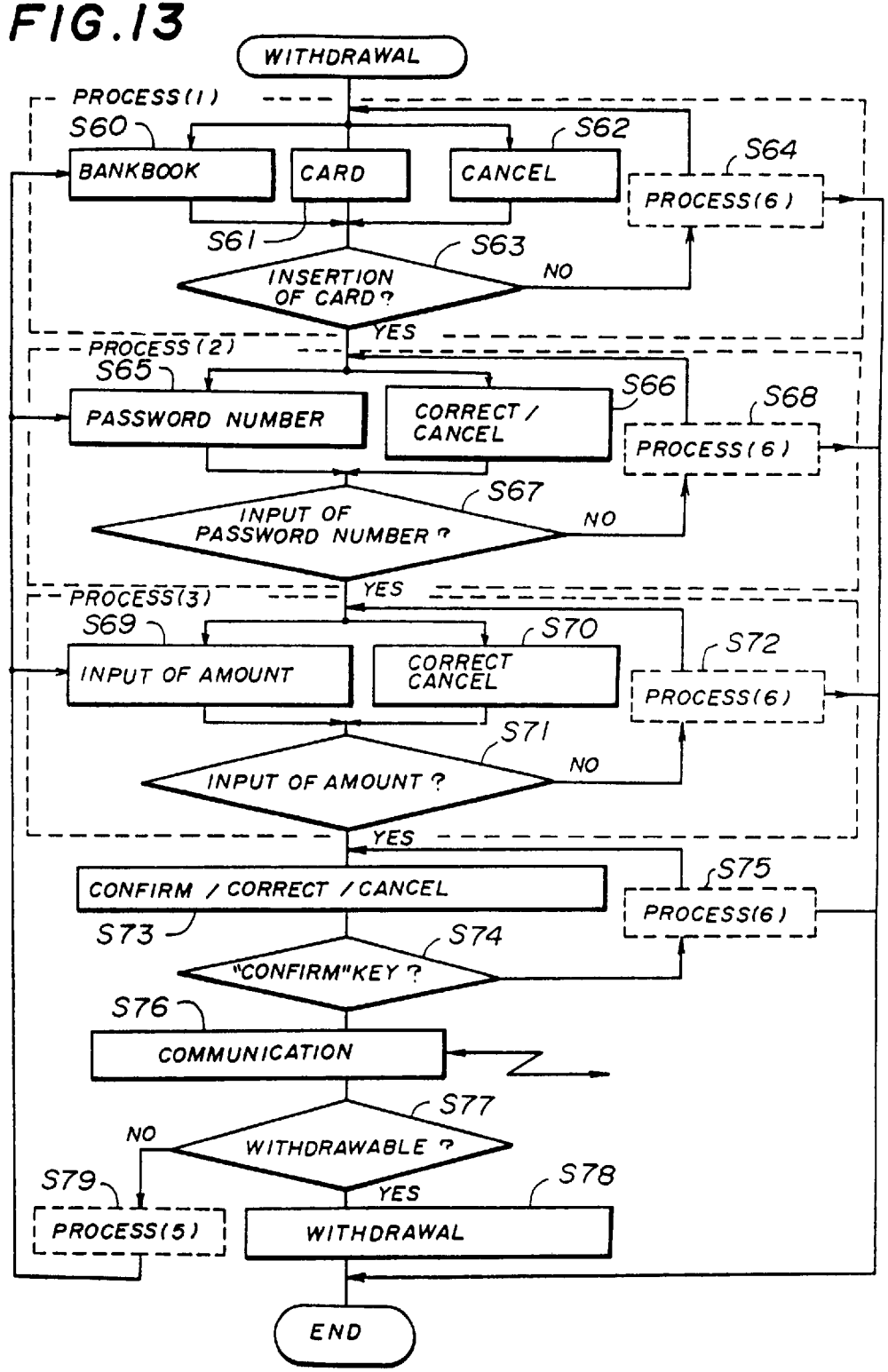

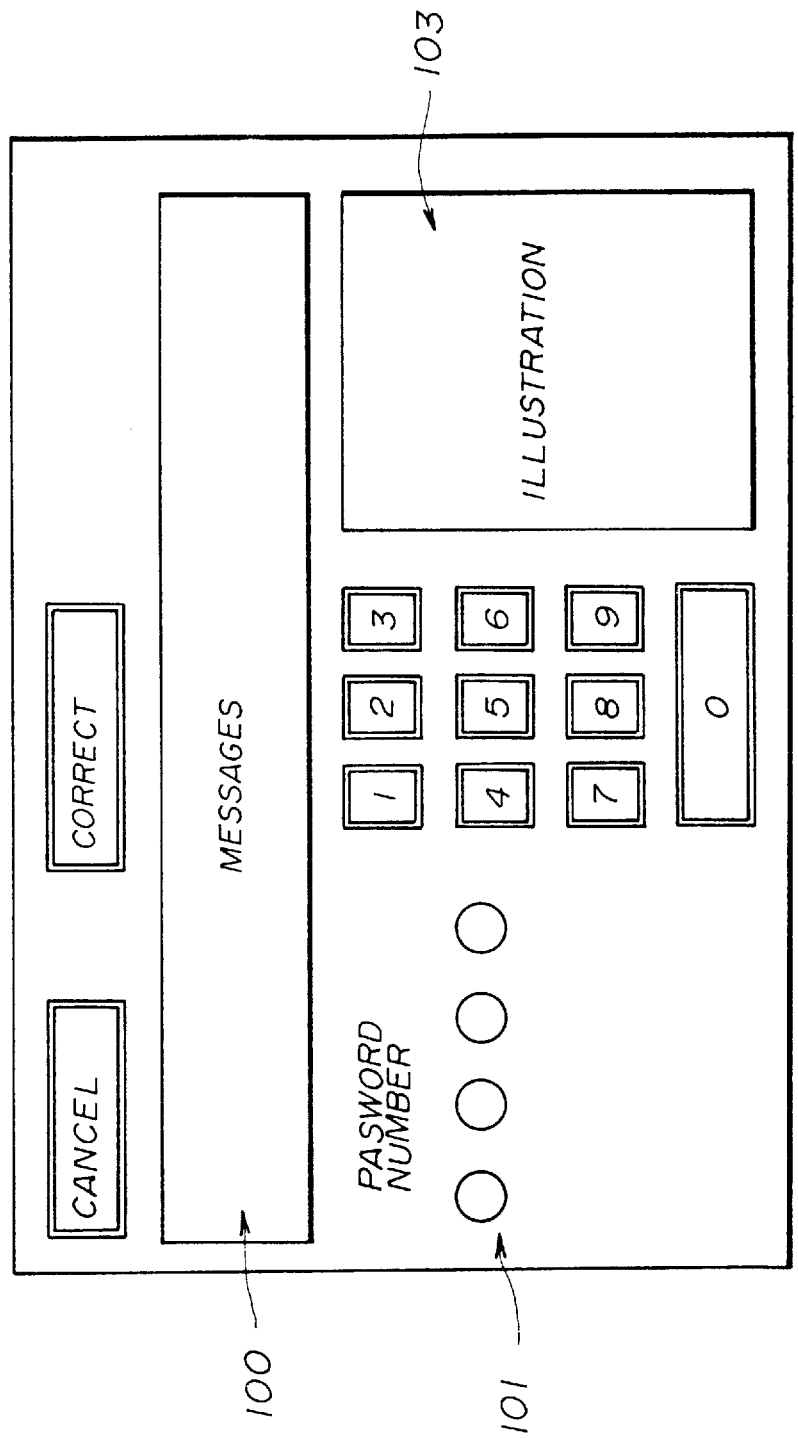

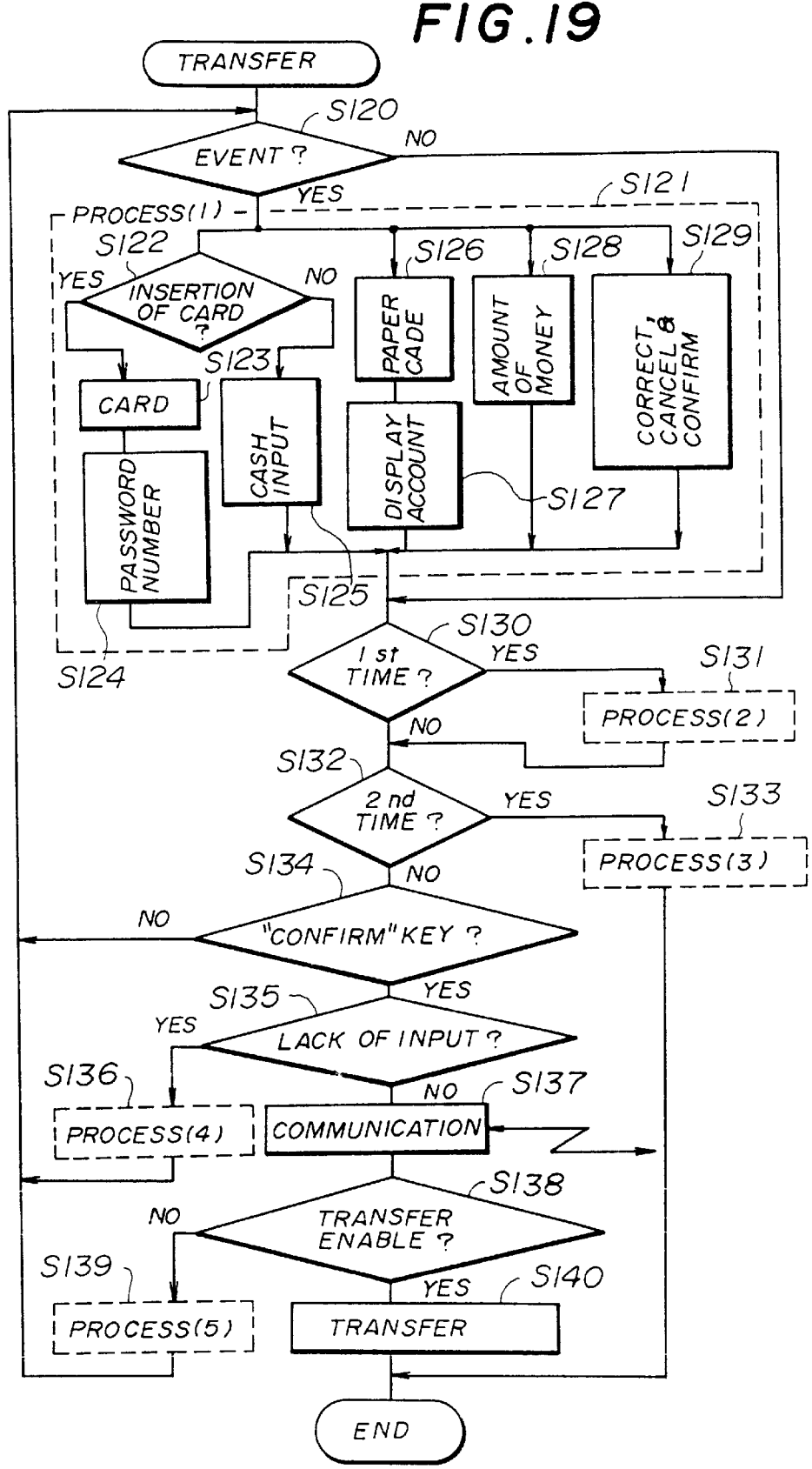

INTERACTIVE I/O TERMINAL

This application is a continuation of application Ser. No. 08/515,173, filed Aug. 15, 1995, now abandoned, which is a continuation of application Ser. No. 08/074,679, filed Jun. 10, 1993, now abandoned.

BACKGROUND OF THE INVENTION (1) Field of the Invention

The present invention generally relates to an interactive I/O terminal such as an automatic teller machine (ATM), and more particularly to an interactive I/O terminal in which user operability is improved.

(2) Description of the Related Art

Automatic teller machines (ATMs) have been provided by banks to facilitate 24-hour account availability. A user (a customer) faces the automatic teller machine (hereinafter simply referred to as an ATM) and operates keys in accordance with instructions displayed on a display panel, so that transactions, such as deposits in the bank and withdrawals from the bank, are executed. To more quickly and easily complete the transactions, it is necessary to improve the user operability of the ATM.

The ATM can be considered as an interactive I/O terminal having a display unit with a screen for displaying information and a touch panel for inputting instructions. The touch panel has transparent switches and covers the screen of the display unit. The instructions required for performing a transaction is displayed on the screen of the display unit. Key marks (hereinafter simply referred to as keys) are also displayed on the screen of the display unit at positions corresponding to the transparent switches of the touch panel covering the screen.

In a conventional ATM, to complete one transaction, a user must perform a plurality of steps in sequence to operate the ATM. Thus, a screen display on the display unit is switched step by step. A screen display in each step is provided, for example, with keys and a message requesting the user to do a predetermined operation. The user operates some of the keys in the screen display in accordance with the message.

For example, screen displays for requesting insertion of a card, insertion of a bankbook, input of a personal identification number, input of an amount in the transaction, and confirmation of the input amount are successively switched on the display unit. The user carries out a corresponding operation in each of the above screen displays on the display unit. As a result, one transaction corresponding to the input amount is executed.

In the above conventional ATM, an entire screen display is switched on the display unit. Thus, when a screen display is switched, the message and keys in the screen display disappear in an instant and a new message and keys appear in the next screen display. As the message and keys disappear in an instant as described above, the user must confirm the positions of the new message and keys in the new screen display every time a screen display is switched. Due to the confirmation of positions of the message and keys, operations on the display unit are delayed.

In addition, the switching of a screen display and the corresponding operation are alternately carried out. Thus, there are large intervals between the carrying out of operations, so that an inordinate amount of time is required to complete one transaction.

SUMMARY OF THE INVENTION

Accordingly, a general object of the present invention is to provide a novel and useful interactive I/O terminal in which the disadvantages of the aforementioned prior art are eliminated.

A more specific object of the present invention is to provide an interactive I/O terminal in which positions of messages and keys in a screen display can be quickly confirmed whenever an operation is to be performed.

The above objects of the invention are achieved by an interactive I/O terminal for supplying information to a user and for-inputting information based on operations of the user in accordance with the information supplied to the user, the interactive I/O terminal comprising: an I/O display panel for displaying a predetermined screen having a display area on which messages are to be displayed and operation keys and for outputting signals corresponding to operation keys operated by the user; a first control device, coupled to the I/O display panel, for controlling the I/O display panel so that messages are displayed on the display area in the screen formed on the I/O display panel; a second control device, coupled to the I/O display panel, for controlling the I/O display panel so that the screen is maintained on the I/O display panel until operations corresponding to a plurality of messages displayed on the display area are completed; and a processor, coupled to the I/O display panel, for performing processes corresponding to the signals supplied from the I/O display panel based on operations of the user.

According to the present invention described above, the screen on which the messages and the input keys are formed is maintained on the I/O display panel until operations corresponding to a plurality of messages displayed on the display area are completed. Thus, the positions of the messages and the keys in the screen can be quickly confirmed whenever an operation is to be performed.

Another object of the present invention is to provide an interactive I/O terminal by which intervals between the carrying out of operations to be performed in one transaction can be decreased thereby decreasing the total transaction time.

The objects of the present invention are achieved by the above interactive I/O terminal in which the first control device controls the I/O display panel so that a plurality of messages are simultaneously displayed.

According to the present invention described above, a plurality of messages are simultaneously displayed on the message display area. Thus, a process for switching the messages one by one can be omitted, so that the intervals between the carrying out of operations to be performed in one transaction can be decreased.

Additional objects, features and advantages of the present invention will become apparent from the following detailed description when read in conjunction with the accompanying drawings.

BRIEF DESCRIPTION OF THE DRAWINGS

FIG. 3 is a diagram illustrating an initial screen display on a display unit of the ATM FIG. 4 is a diagram illustrating a screen display in a withdrawal transaction in which money is paid out by the ATM.

FIGS. 5A, 5B, 5C, 5D, 5E, 5F, 5G and 5H are diagrams illustrating screen displays in cases where correct operations have been not performed, each of the screen displays being provided with messages displayed on a message display area shown in FIG. 4.

FIGS. 9A, 9B and 9C are diagrams illustrating messages to be displayed on a message display area on the screen shown by FIG. 8 in the processes shown in FIG. 7.

FIG. 11 is a diagram illustrating a withdrawal transaction screen display selected in the processes shown in FIG. 10.

FIGS. 12A and 12B are diagram illustrating messages to be displayed on a message display area in the screen shown in FIG. 11 in the processes shown in FIG. 10.

FIG. 13 is a flow chart illustrating processes to be executed in the ATM according to a fifth embodiment of the present invention.

FIG. 18 is a diagram illustrating a screen display formed on the display unit in a balance reference transaction.

FIG. 19 is a flow chart illustrating processes to be executed by in the ATM according to an eighth embodiment of the present invention.

DESCRIPTION OF PREFERRED EMBODIMENTS

A description will now be given, with reference to FIGS. 1 through 5H, of a first embodiment of the present invention.

Figure 1:
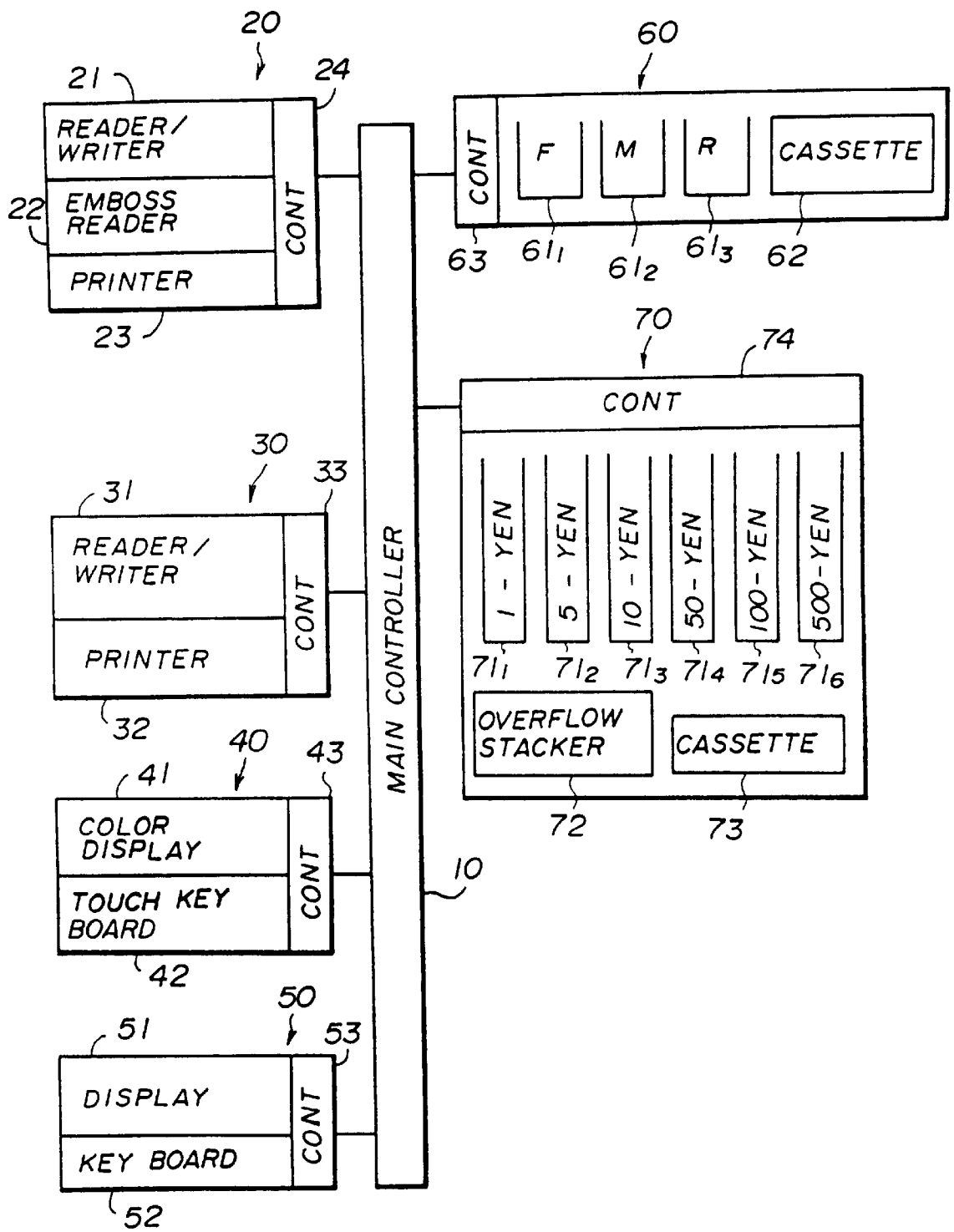
FIG. 1 is a block diagram illustrating a structure of an ATM.

Referring to FIG. 1, an ATM, for example, has a main controller 10 including a micro-processor (not shown), a ROM (Read Only Memory, not shown), a RAM (Random Access Memory, not shown) and the like. The ATM has also a card processing unit 20, a bankbook processing unit 30, a user interface unit 40, a supervisory operation unit 50, a bill processing unit 60, and a coin processing unit 70, all of which are connected to the main controller 10.

The card processing unit 20 has a reader/writer 21, an embossed character reader 22, a printer 23 and a controller 24. The card processing unit 20 processes information obtained from a card inserted into the ATM. The reader/writer 21 reads from various types of cards (e.g. JIS cards, ISO cards and transfer cards formed of paper) data recorded thereon, and writes data therein. The embossed character reader 22 reads embossed characters formed on the card and outputs image data corresponding to the embossed characters. The data read by the reader/writer 21 and the image data output from the embossed character reader 22 are used in banking transactions. The printer 23 forms journal printings regarding the result and/or progress of the transactions, and prints information on receipt sheet. The controller 24 controls the reader/writer 21, the embossed character reader 22 and the printer 23, and relays data from the main controller 10.

The bankbook processing unit 30 has a magnetic stripe reader/writer 31, a bankbook printer 32, and controller 33. The bankbook processing unit 30 processes a bankbook inserted into the ATM. The magnetic stripe reader/writer 31 reads out data from a magnetic strip provided on the bankbook and the data is used in the banking transactions. Data indicating the transaction result and other data may be written in the magnetic stripe by the magnetic stripe reader/writer 31. The bankbook printer 32 prints the transaction result (e.g. the amount of money). The controller 33 controls the magnetic stripe reader/writer 31 and the bankbook printer 32 and relays data from the main controller 10.

The user interface unit 40 has a color display panel 41 and a touch keyboard panel 42. The user interface unit 40 is used for indicating information to users and for inputting instructions to the ATM. The color display panel 41 displays messages regarding the performing of operations, input keys and the like. A detailed description of the message and the input keys displayed on the color display panel 41 will be given later. The touch keyboard panel 42 is typically made of a transparent sheet having transparent switches are arranged in a matrix. The touch keyboard panel 42 is closely adhered to the surface of the color display panel 41 so that the transparent switches face the input keys to be displayed on the color display panel 41. The display screen on the color display panel 41 can be seen through the touch keyboard panel 42. When a transparent switch is turned on, by pressing it, a signal corresponding to an input key facing the pressed transparent switch is output from the touch keyboard panel 42. The controller 43 controls the color display unit 41 and the touch keyboard panel 42 and relays data from the main controller 10. For example, the controller 43 determines, based on the signal supplied from the touch keyboard panel, which key has been operated.

The supervisory operation unit 50 has a liquid crystal display panel 51, a keyboard panel 52 and a controller 53. The supervisory operation unit 50 is operated by maintenance staff. The liquid crystal display panel 51 displays various states of the ATM and messages for the maintenance staff. The keyboard panel 52 is used by the maintenance staff to input various items of information. The controller 53 controls the liquid crystal display panel 51 and the keyboard 52 and relays data between the main controller 10 and each of them. The maintenance staff executes maintenance work by operating the keyboard 52 in accordance with messages displayed on the liquid crystal display panel 51.

The bill processing unit 60 has three stackers $61_1$ through $61_3$, a bill cassette 62 and a controller 63. The bill processing unit 60 stacks bills in a deposit transaction and ejects bills in a withdrawal transaction. The three stackers $61_1$ through $61_3$ are respectively referred to as an F stacker $61_1$, an M stacker $61_2$ and an R stacker $61_3$. In a deposit transaction or a transfer transaction, bills input through an input port are classified according to the denominations of the bills, the respective denominations of the bills being stacked in the F stacker $61_1$, the M stacker $61_2$ and the R stacker $61_3$. In a withdrawal transaction, the required number of bills are picked out, in accordance with the amount of payment and the denominations of bills required by a user, from among the bills stacked in the F stacker $61_1$, the M stacker $61_2$ and the R stacker $61_3$, and are then ejected through an output port. The bill cassette 62 is mounted in the ATM by the maintenance staff before the ATM is operated. The bills stored in the bill cassette 62 are loaded into the F stacker $61_1$, the M stacker $61_2$ and the R stacker $61_3$ as the occasion arises. The controller 63 controls the stackers $61_1$, $61_2$ and $61_3$ and the bill cassette 62 and relays data from the main controller 10.

The coin processing unit 70 has six stackers $71_1$ through $71_6$, an overflow stacker 72, a coin cassette 73 and a controller 74. The coin processing unit 70 stacks coins in a deposit transaction and ejects coins in a withdrawal transaction. The six coin stackers are referred to as a 1-Yen stacker $71_1$, a 5-Yen stacker $71_2$, a 10-Yen stacker $71_3$, a 50-Yen stacker $71_4$, a 100-Yen stacker $71_5$ and a 500-Yen stacker $71_6$. In a deposit transaction and a transfer transaction, coins input through the input port are classified according to the denominations of the coins, and the respective denominations of the coins are stacked in the 1-Yen stacker $71_1$, the 5-Yen stacker $71_2$, the 10-Yen stacker $71_3$, the 50-Yen stacker $71_4$, the 100-Yen stacker $71_5$ and the 500-Yen stacker $71_6$. In a withdrawal transaction, the required number of coins are picked out, in accordance with the amount of payment and the denominations of coins required by a user, from among the coins stacked in the 1-Yen stacker $71_1$, the 5-Yen stacker $71_2$, the 10-Yen stacker $71_3$, the 50-Yen stacker $71_4$, the 100-Yen stacker $71_5$ and the 500-Yen stacker $71_6$, and are then ejected through an output port. The overflow stacker 72 stores overflow coins of each of the stackers $71_1$ through $71_6$. The coin cassette 73 is mounted in the ATM by the maintenance staff before starting the ATM. The coins stored in the coin cassette 73 are loaded into the 1-Yen stacker $71_1$, the 5-Yen stacker $71_2$, the 10-Yen stacker $71_3$, the 50-Yen stacker $71_4$ and the 100-Yen stacker $71_5$ and the 500-Yen stacker $71_6$ as occasion arises. The controller 74 controls the stackers $71_1$ through $71_6$, the overflow stacker 72 and the coin cassette 73 and relays data from the main controller 10.

A detailed description will now be given of operations with reference to display screens.

A transaction selecting display screen, for example as shown in FIG. 3, is initially formed on the color display panel 41 of the user interface unit 40. Referring to FIG. 3, a "DEPOSIT" key, a "WITHDRAWAL" key, a "BANKBOOK" key, a "BALANCE" key, a "TRANSFER I" key, and a "TRANSFER II" key, all of which are indicated as areas surrounded by doubled lines, are arranged, in accordance with a predetermined arrangement form in the transaction selecting display screen. The respective keys correspond to banking transactions. As shown in FIG. 3, the "DEPOSIT" key corresponds to a deposit transaction for depositing money in a bank account, the "WITHDRAWAL" key corresponds to a withdrawal transaction for withdrawing money from a bank account, the "BANKBOOK" key corresponds to a banking transaction for entering an amount of money in a bankbook, the "BALANCE" key corresponds to a banking transaction for confirming a balance in a bank account, the "TRANSFER I" key corresponds to a first type of transfer transaction, and the "TRANSFER II" key corresponds to a second type of transfer transaction. When a user touches (presses) one of the input keys on the color display panel 41, a signal corresponding to the touched input key is supplied from the touch key board panel 42 to the main controller 10 via the controller 43 of the user interface unit 40.

When, for example, the "WITHDRAWAL" key on the color display panel 41 is touched by a user, the transaction selecting display screen shown in FIG. 3 is switched to a withdrawal transaction display screen, for example as shown in FIG. 4. Referring to FIG. 4, a "CANCEL" key, a "CORRECT" key, a "CONFIRMATION" key, a first set of numeral keys "0" to "9", a second set of numeral keys "0" to "9", figure keys and a "YEN" key are arranged in the withdrawal transaction display screen on the color display panel 41. There are also a "MAN (ten thousand in Japanese)" figure key and a "SEN (thousand in Japanese)" figure key. A message display area 100, a PIN (personal identification number) display area 101 and an amount display area 102 are formed in the withdrawal transaction display screen. Various messages related to the withdrawal transaction are displayed on the message display area 100. The PIN display area 101 is positioned close to the first set of numeral keys, and a personal identification number (hereinafter simply referred to as a PI number), typically formed of 4 digits, is input by use of the first set of numeral keys. A predetermined mark (e.g. *) is displayed on the PIN display area 101 every time each numeral key corresponding to one of the digits of the PI number is operated. The amount display area 102 is close to the second set of numeral keys, an amount of money input by use of the second set of numeral keys, the figure keys and the "YEN" key being displayed on the amount display area 102.

Initially, messages for all operations required for performing the withdrawal transaction are simultaneously displayed on the message display area 100 as shown in FIG. 5A. In this initial state, a user may perform the following operations required for executing the withdrawal transaction in an arbitrary order:

1) inserting a card and/or bankbook,
2) inputting a PI number, and
3) inputting an amount of money.

Figure 2:
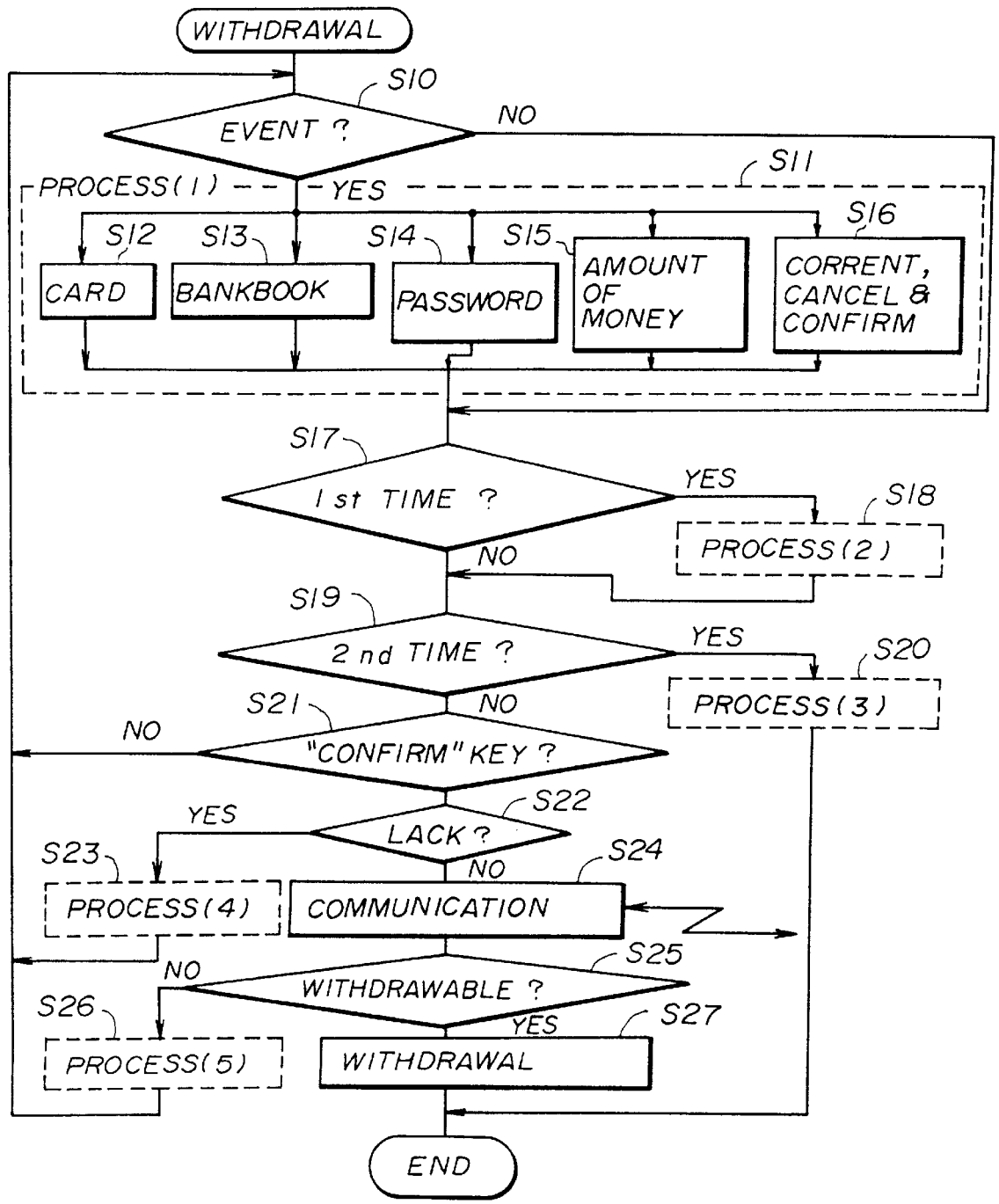
FIG. 2 is a flow chart illustrating processes to be executed in the ATM according to a first embodiment of the present invention.

The main controller 10 starts to perform a process in accordance with a flow chart shown in FIG. 2. Referring to FIG. 2, it is determined, in step S10, whether or not an event (a operation) has occurred. When the card processing unit 20 detects an insertion of a card, when the bankbook processing unit 30 detects an insertion of a bankbook, or when a key displayed in the withdrawal transaction display screen is operated, the main controller 10 determines that an event has occurred. When it is determined that an event has occurred, the main controller 10 carries out a first process (1) depending on a type of the event in step S11. If an insertion of a card is detected by the card processing unit 20, a card process for, for example, reading out information from a magnetic stripe formed on the card is performed in step S12. If an insertion of a bankbook is detected by the bankbook processing unit 30, a bankbook process for, for example, reading out information from a magnetic stripe formed on the bankbook is performed in step S13. If an operation of the first set of numeral keys is detected, a PI number input process for receiving, as a PI number, four digits input by use of the first set of numeral keys is performed in step S14. If an operation of the second set of numeral keys are detected, an amount input process for inputting an amount of money is performed in step S15. When the "YEN" key is operated, the amount input process is completed and a preceding account request is supplied from the main controller 10 to the bill processing unit 60 and the coin processing unit 70. Due to the preceding account request, even if all the information required for the withdrawal transaction has not been input yet, the bill processing unit 60 and the coin processing unit 70 count the number of bills and coins by an amount of money input by use of the second set of numeral keys and perform preparation of the withdrawal. As the numbers of bills and/or coins are mechanically counted based on the preceding account request, without regard to performing the other processes, the withdrawal transaction can be completed quickly upon completion of the other processes.

If one of keys "CORRECT", "CANCEL" and "CONFIRM" is operated, a correction/cancel/confirmation process is performed in step S16. In a case where the "CORRECT" key has been operated, a value (a PI number or an amount of money) which has been input is cleared, and messages as shown in FIG. 5H are displayed on the message display area 100 requesting the user to input a PI number or an amount of money. In a case where the "CANCEL" key has been operated, the card and/or the bankbook are ejected and the withdrawal transaction is completed. In a case where the "CONFIRM" key has been operated, the process proceeds as will be described later.

On the other hand, when, in step S10, it is determined that an event has not occurred yet, step 11 is skipped. It is then determined, in step S17, whether or not a first time has elapsed before some of all the operations for the withdrawal transaction have been completed. When it is determined that the first time has elapsed in step S17, a second process (2) is performed in step S18. In the second process (2), supplemental messages for an operation which has not been performed for the withdrawal transaction are displayed on the message display area 100. In a case where an amount of money has not been input within the first time after a PI number is input, a supplemental message, as shown in FIG. 5D, requesting the user to input an amount of money is displayed on the message display area 100. In a case where the PI number has not been input within the first time after an amount of money is input, a supplemental message, as shown in FIG. 5E, is displayed on the message display area 100 requesting the user to input a PI number. In a case where a card has not been inserted within the first time after a key on the touch key board panel 42 (the withdrawal transaction display screen) is operated, a supplemental message is displayed on the message display area 100 requesting the user to insert a card. Even if a bankbook is not inserted, the withdrawal can be performed, and, in such a case, a supplemental message is not displayed.

When it is determined that the first time has not lapsed yet or when the process (2) has been completed, it is determined, in step S19, whether or not a second time has elapsed. When it is determined that the second time has lapsed, a third process (3) is performed in step S20. In the third process (3), a card and/or a bankbook which has been inserted into the ATM is ejected. After the third process (3) is completed, the withdrawal transaction is completed. On the other hand, when it is determined, in step S19, that the second time has not elapsed yet, the main controller 10 determines, in step S21, whether or not the "CONFIRM" key has been operated. When the "CONFIRM" key has not been operated yet, the process returns to step S10 and the above steps are repeated. When the "CONFIRM" key has been operated, the main controller 10 determines, in step S22, whether or not any operation for the withdrawal transaction has not been performed. That is, in step S22, it is determined whether or not a card has been inserted, and whether or not a PI number and a amount of money have been input. When it is determined that there has been lack of operations for the withdrawal transaction, a fourth process (4) is performed in step S23. In the fourth process (4), when a card has not been inserted or when a PI number or an amount of money has not been input, messages corresponding to the lack of operations are displayed on the message display area 100 requesting the user to insert card or to input a PI number and an amount of money. For example, in a case where a card has not been inserted, a message as shown in FIG. 5F is displayed on the message display area 100 requesting the user to insert the card.

When all of the operations for the withdrawal transaction have been performed, communication is carried out between the ATM and a host computer, in step S24, so that information input by the above operation and read out from the card and/or the bankbook are transmitted from the ATM to the host computer. The host computer checks the correctness of this withdrawal transaction, based on the information supplied from the ATM. The result of this check is returned by the host computer to the ATM. The main controller 10 of the ATM determines, based on the result of the check, supplied from the host computer, in step S25, whether or not the withdrawal of the amount of money input by the user can be performed. If the withdrawal cannot be performed, a fifth process (5) is performed in step S26. In the fifth process (5), a message indicating the refusal of the withdrawal is displayed on the message display area 100. If the withdrawal has been refused due to an erroneous PI number being input by the user, a message as shown in FIG. 5B is displayed on the message display area 100. If the withdrawal refusal is caused by an insufficient balance in the bank account, a message as shown in FIG. 5C is displayed on the message display area 100. After step S26, the process returns to step S10 and the process is performed in accordance with the above procedure. On the other hand, when it is determined, in step S25, that the withdrawal can be performed, a withdrawal process is performed in step S27. In the withdrawal process, the bankbook printer 32 of the bankbook processing unit 30 is driven so that the amount of the withdrawal and the amount of the balance in the bank account are printed on the bankbook inserted in the ATM. In addition, the printer 23 of the card processing unit 20 is driven so that a receipt and a journal are printed out. The bill processing unit 60 and the coin processing unit 70 respectively output the number of bills and the number of coins corresponding to the amount of money input by the user. Thereafter, the card and/or the bankbook are ejected, and then the withdrawal transaction is completed. When the withdrawal transaction is completed, the withdrawal transaction display screen shown in FIG. 4 is switched back to the transaction selecting display screen shown in FIG. 3.

As has been described above, the messages for all operations required for the withdrawal transaction are displayed once on the message display area 100 in the withdrawal transaction display screen without having to switch the display screen. In addition, various keys to be operated by a user are continuously displayed at fixed positions in the withdrawal transaction display screen until the withdrawal transaction is completed. Thus, positions of messages and keys in the withdrawal transaction display screen can be quickly confirmed whenever an operation is performed. As a result, the keys can be smoothly operated in accordance with the messages in the withdrawal transaction screen display, and the withdrawal transaction can be quickly carried out.

As operations (e.g. inserting a card, inserting a bankbook, inputting a PI number and inputting an amount of money) required for executing the withdrawal transaction can be performed in an arbitrary order, operability is improved. In addition, as a plurality of processes executed in response to operations required for the withdrawal transaction are performed concurrently, these processes can be quickly performed.

A description will now be given, with reference to FIG. 6, of a second embodiment of the present invention. In the second embodiment, a timing at which the communication between the ATM and the host computer is to be performed differs from the timing in the first embodiment described above.

Figure 6:
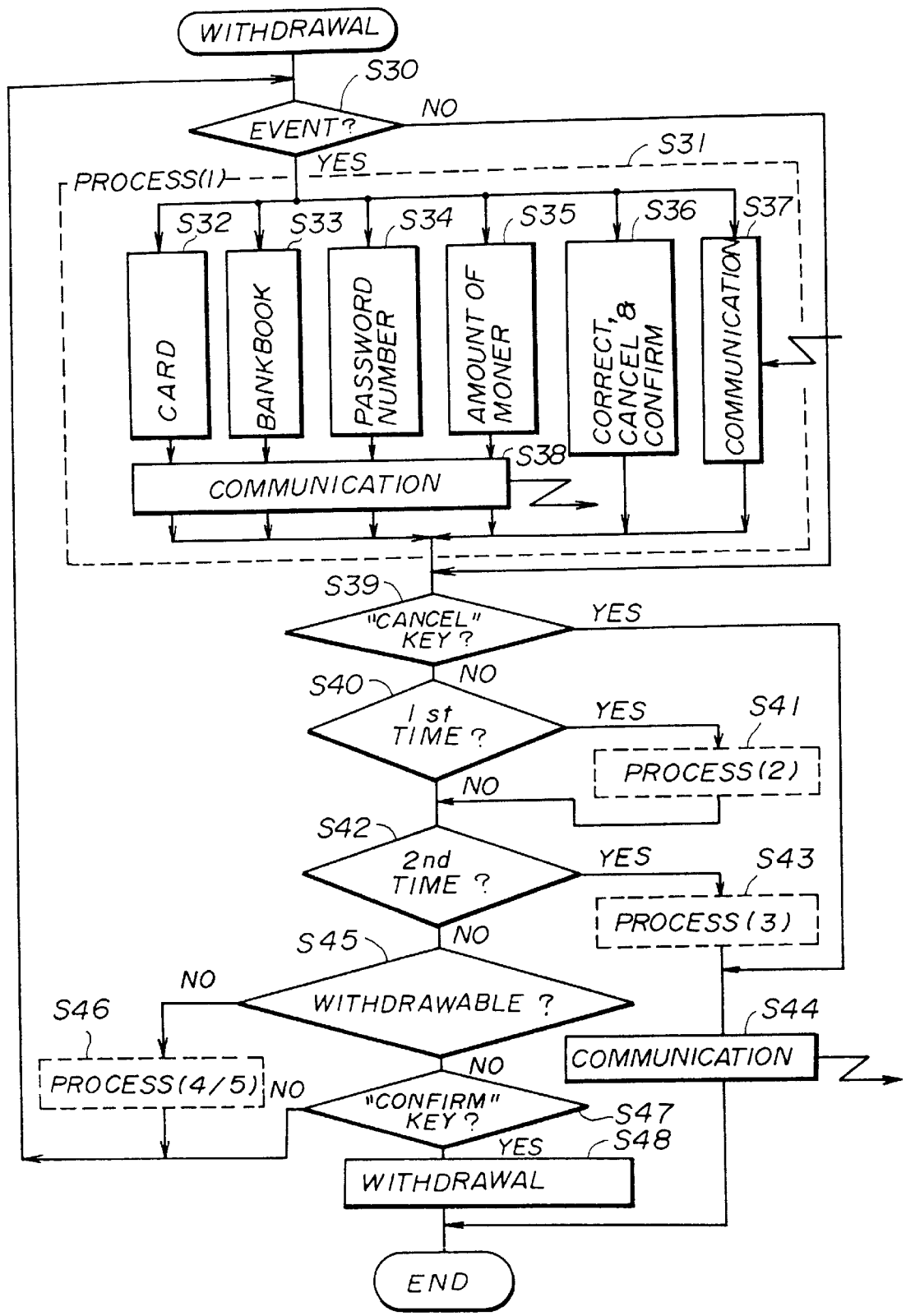
FIG. 6 is a flow chart illustrating processes to be executed in the ATM according to a second embodiment of the present invention.

When the "WITHDRAWAL" key in the transaction selecting display screen, as shown in FIG. 3, is touched by a user, the screen display is switched to the withdrawal transaction display screen, as shown in FIG. 4 and a processing routine, as shown in FIG. 6, is accessed in the main controller 10. Referring to FIG. 6, the main controller 10 determines, in step S30, whether or not an event has occurred. When it is determined that an event has occurred, the first process (1) is performed in step S31. In the first process (1), the card process (in step S32), the bankbook process (in step S33), the input process for a PI number (in step S34), the correct, cancel and confirm process (in step S36) and the input process for an amount of money (in step S35) are performed. After these processes are performed, a communication process is performed in step S38. In the communication process, information read out from the magnetic stripes of a card and a bankbook, a PI number input by use of the first set of numeral keys and an amount of money input by use of the second set of numeral keys are transmitted from the ATM to the host computer. The host computer checks the correctness of the information supplied from the ATM and returns a result of the check to the ATM. The main controller receives the result of the check transmitted from the host computer in step S37.

After the communication between the ATM and the host computer is completed, it is determined, in step S39, whether or not the "CANCEL" key has been touched. When the "CANCEL" key has been touched by a user, the process proceeds to step S44. In step S44, communication between the ATM and the host computer is performed to cancel the information read out from the magnetic stripes of the card and the bankbook, the PI number and the amount of money all of which have been transmitted from the ATM to the host computer. After the communication in step S44 is completed, the process for the withdrawal transaction is completed.

On the other hand, when it is determined, in step S39, that the "CANCEL" key has not been operated, it is then determined, in step 40, whether or not the first time has elapsed in the same manner as in the first embodiment. When it is determined that the first time has elapsed, the second process (2) described above is performed in step S41. After this, the main controller 10 determines, in step S42, whether or not the second time has elapsed. When it is determined that the second time has elapsed, the third process (3) is performed in step S43 in the same manner as in the first embodiment. On the other hand, when it is determined that both the first and second times have not elapsed yet, the main controller 10 determines, in step S45, whether or not the withdrawal can be performed, based on data received in the communication process in step S37. When it is determined that the withdrawal can not be performed, a message is displayed on the message display area 100 (process (415)) in step S46. If a PI number is incorrect, a message as shown in FIG. 5B is displayed on the message display area 100. If an amount of money input by the user is incorrect, a message as shown in FIG. 5C is displayed on the message display area 100.

When it is determined that the withdrawal can be performed, the main controller 10 determines, in step S47, whether or not the "CONFIRM" key has been operated. If the "CONFIRM" key has not been operated, the process returns to step 30 and the main controller 10 waits for the "CONFIRM" key to be operated while the above steps are repeated. When it is determined that the "CONFIRM" key has been operated, the withdrawal process is performed in step S48 in the same manner as in the first embodiment.

According to the second embodiment, immediately after data to be checked by the host computer is input to the ATM, the communication between the ATM and the host computer is performed and the correctness of the data is checked by the host computer. Thus, the communication and the operations by a user can be concurrently performed with each other, decreasing the total amount of time required for the withdrawal transaction. In addition, as the correctness of the input data has already been checked by the time the user operates the "CONFIRM" key, the withdrawal can be performed immediately after the user operates the "CONFIRM" key. That is, the quality of service for users is improved.

Figure 7:
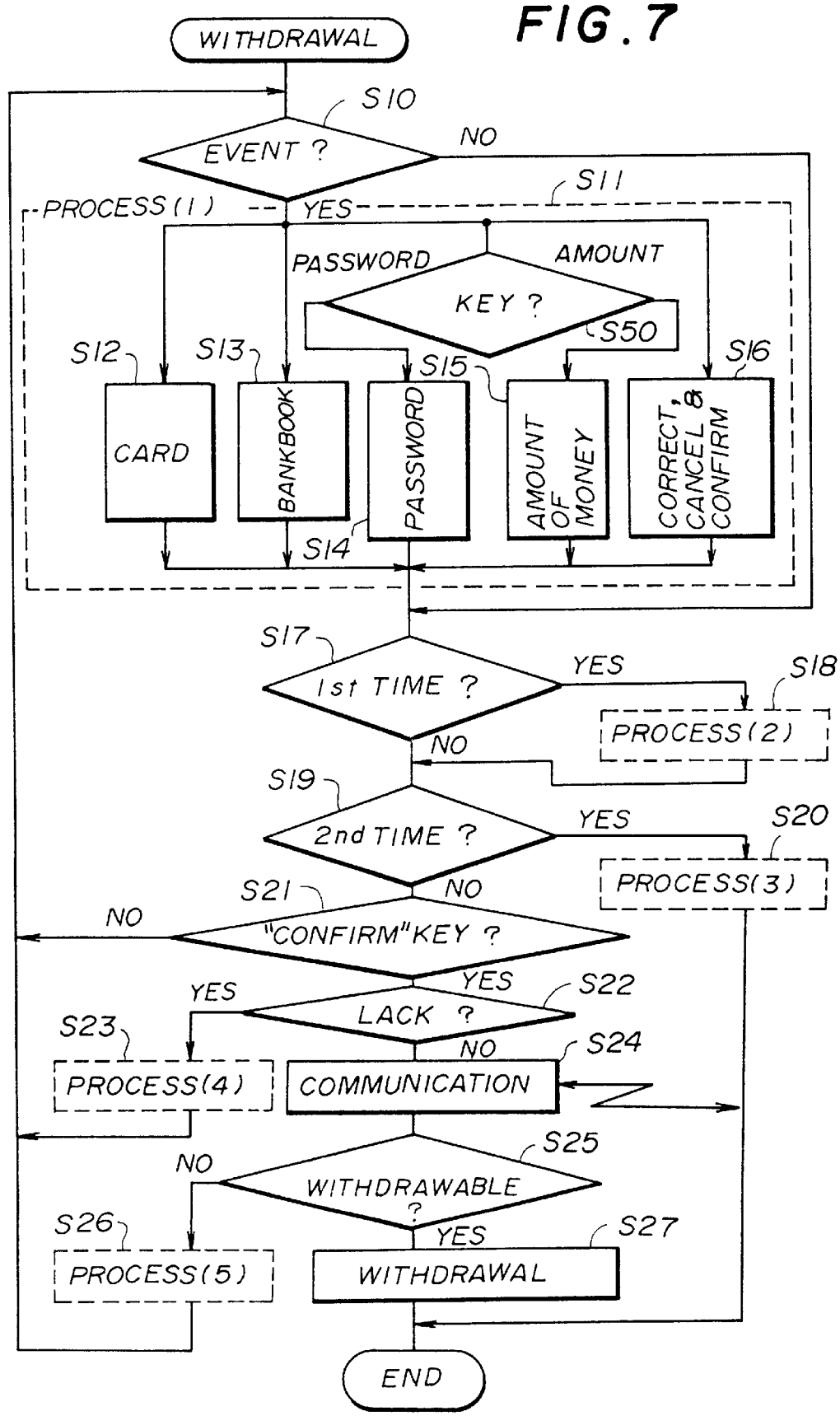
FIG. 7 is a flow chart illustrating processes to be executed in the ATM according to a third embodiment of the present invention.
Figure 8:
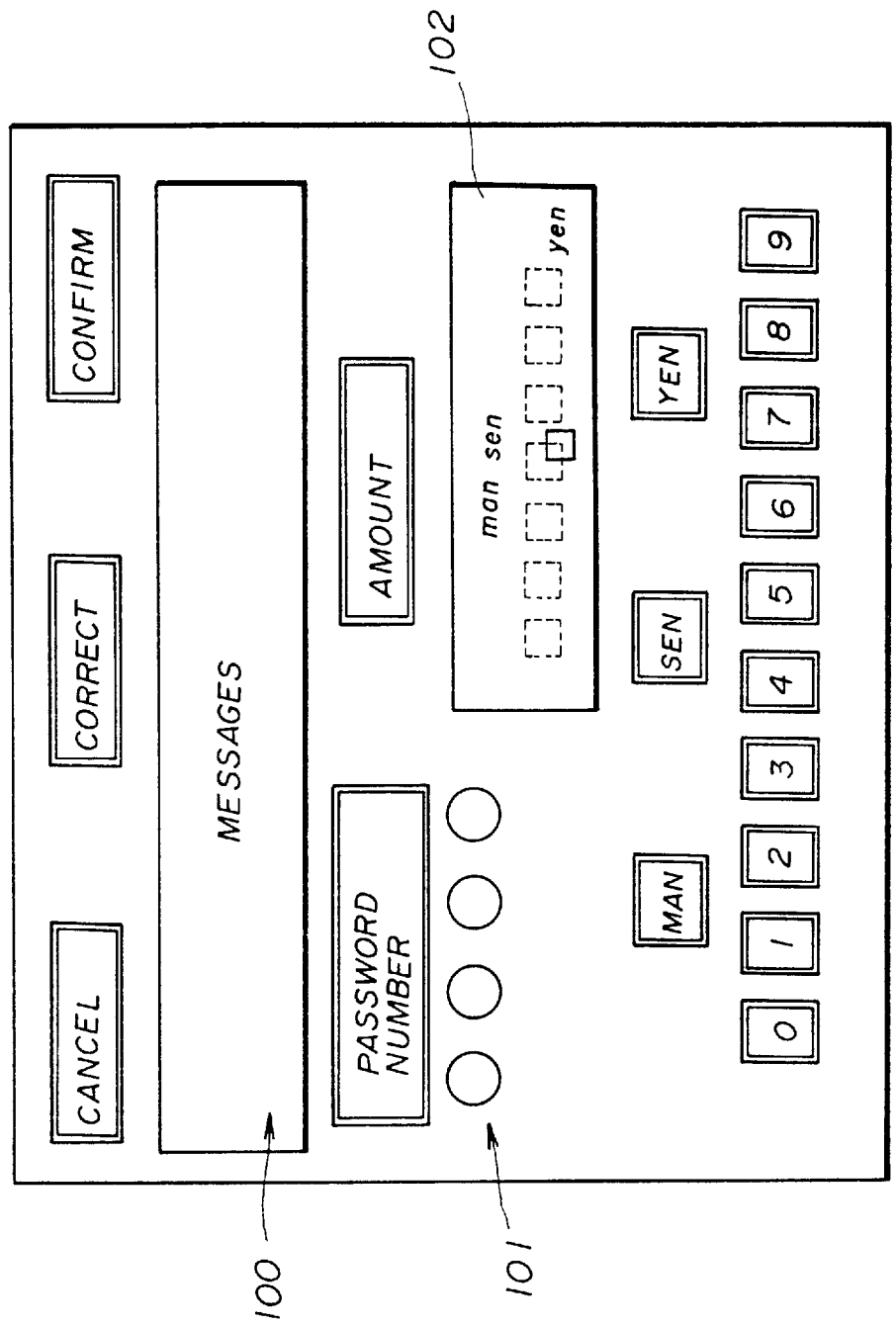
FIG. 8 is a diagram illustrating a withdrawal transaction screen display selected in the processes shown in FIG. 7.

A description will now be given, with reference to FIGS. 7 through 9C, of a third embodiment of the present invention. In the third embodiment, only one set of numeral keys is displayed in the withdrawal transaction display screen, as shown in FIG. 8. The overall process, as shown in FIG. 7, is substantially the same as that shown in FIG. 2. In FIG. 7, those steps which are the same as those shown in FIG. 2 are given the same reference numbers.

When the "WITHDRAWAL" key in the transaction selecting display screen, as shown in FIG. 3, is operated, the display screen is switched to the withdrawal transaction display screen, as shown in FIG. 8. Referring to FIG. 8, the "CANCEL" key, the "CORRECT" key, and the "CONFIRM" key are arranged and the message display area 100, the PIN display area 101 and the amount display area 102 are formed, on the withdrawal transaction display screen in the same manner as those shown in FIG. 4. Only one set of numeral keys "0" to "9", the figure keys "MAN (ten thousand)" and "SEN (thousand)" and the "YEN" key are arranged under the PIN display area 101 and the amount display area 102 on the withdrawal transaction display screen. The set single of numeral keys is used for inputting both a PI number and an amount of money. The withdrawal transaction display screen is further provided with a "PIN" key and an "AMOUNT" key. The "PIN" key is used for selecting an operation for inputting a PI number. The "AMOUNT" key is used for selecting an operation for inputting an amount of money in the withdrawal transaction.

When the above withdrawal transaction display screen is formed on the color display panel 41, the following messages corresponding to all operations for the withdrawal transaction are displayed on the message display area 100 as shown in FIG. 9A:

INSERT CARD/BANKBOOK,

INPUT PI NUMBER AFTER OPERATING "PIN" KEY,

INPUT AMOUNT OF MONEY AFTER OPERATING "AMOUNT" KEY, and

PRESS "CONFIRM" KEY IF CORRECT.

That is, in this case, a user may perform the following operations required for executing the withdrawal transaction in an arbitrary order:

1) inserting a card and/or bankbook, 2) inputting a PI number, and 3) inputting an amount of money.

The main controller 10 starts to perform a process in accordance with a flow chart shown in FIG. 7. When a user touches the "PIN" key to input a PI number, the main controller 10 determines that an event has occurred in step S10 and the first process (1) starts in step S11. In the first process (1), it is determined, in step S50, whether the operated key is the "PIN" key or the "AMOUNT" key. When it is determined that the "PIN" key has been operated, the PI number input process is performed in step S14. In the PI number input process, the figure keys "MAN" and "SEN"

and the "YEN" key are unavailable. Even if the figure keys "MAN" and "SEN" and the "YEN" key are operated, signals from these keys are not input to the ATM. If an amount of money has not already been input by the time a PI number is input, messages are displayed on the message display area 100 as shown in FIG. 9B requesting the user to input an amount of money.

On the other hand, when the "AMOUNT" key is touched by the user, the main controller 10 determines, in step 10, that an event has occurred, and the first process (1) is started. In the first process (1), when the main controller 10 determines, in step S50, that the "AMOUNT" key has been operated, the amount input process is performed in step S15. In the amount input process, if the PI number has not already been input by the time an amount of money is input, messages are displayed on the message display area 100 as shown in FIG. 9C requesting the user to input a PI number.

After this, the process is successively performed in the same manner as that shown in FIG. 2.

According to the third embodiment, only one set of numeral keys is formed on the withdrawal transaction display screen, and due to an operation of the "PIN" key or the "AMOUNT" key, the set of numeral keys is used for inputting a PI number or for inputting an amount of money. Thus, the key arrangement on the withdrawal transaction display screen is simpler than that shown in FIG. 4. As a result, it is easy for the user to recognize the position of each key on the withdrawal transaction display screen, and user operability is improved.

Figure 10:
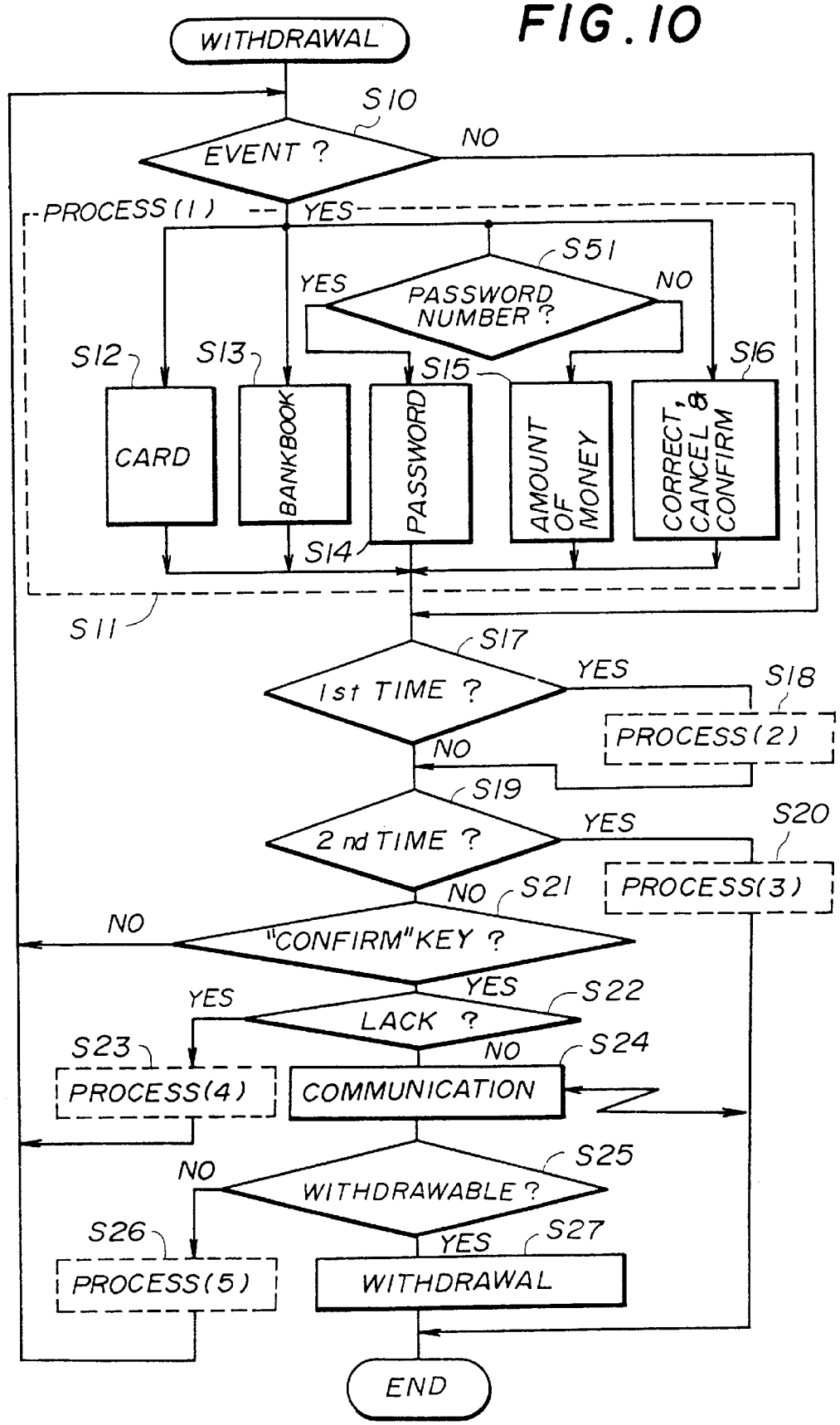
FIG. 10 is a flow chart illustrating processes to be executed in the ATM according to a fourth embodiment of the present invention.

A description will now be given, with reference to FIGS. 10 through 12B, of a fourth embodiment of the present invention. In the fourth embodiment, a PI number and an amount of money must be input in a uniform order in the withdrawal transaction. As a result, the "PIN" key and the "AMOUNT" key shown in FIG. 8 are removed from the withdrawal transaction display screen. A process shown in FIG. 10 is similar to that shown in FIG. 7. In FIG. 10, those steps which are the same as those shown in FIG. 7 are given the same reference numbers.

When the "WITHDRAWAL" key in the transaction selecting display screen shown in FIG. 3 is operated, the display screen is switched to the withdrawal transaction display screen as shown in FIG. 11. Referring to FIG. 11, the word "PIN" is displayed over the PIN display area 101, and the word "AMOUNT" is displayed over the amount display area 102. That is, the "PIN" key and the "AMOUNT" key shown in FIG. 8 are not formed on the withdrawal transaction display screen in this embodiment. The "CANCEL" key, the "CORRECT" key, the "CONFIRM" key, the numeral keys "0" to "9", the figure keys "MAN" and "SEN", the "YEN" key and the display areas 100, 101 and 102 are arranged in the withdrawal transaction display screen in the same manner as those shown in FIG. 8. In the withdrawal transaction display screen, messages are displayed on the message display area 100 as shown in FIG. 12A. In this state, the following operation can be executed in an arbitrary order:

1) inserting a card and/or a bankbook, and
2) inputting of a PI number.

In the above messages displayed on the message display area 100, a part for urging a user to input a PI number is distinguished from other parts by color, blinking, or a special display form or the like. As a result, a user is informed that the ATM is waiting for an input of a PI number. In this state, when numeral keys are operated, the main controller 10 determines, in step S10, that an event has occurred and the first process (1) is started. In the first process (1), the main controller determines, in step S51, whether or not a PI number has been input, with reference to a PI number flag in the main controller 10. When it is determined that a PI number has not been input yet, the main controller 10 recognizes that one set of numeral keys "0" to "9" is to be used for inputting a PI number. The PI number input process is then performed in step S14. In the PI number input process, the PI number flag is set. The figure keys "MAN" and "SEN" and the "YEN" key are unavailable. When a PI number is input by use of the numeral keys, four marks (e.g. *) corresponding to key operations of four digits of the PI number are displayed on the PIN display area 101 and messages are displayed on the message display area 100 as shown in FIG. 12B to urge the user to input an amount of money.

In this state, when the numeral keys are operated, the main controller 10 determines again, in step S10, that an event has occurred and the first process (1) is restarted. In the first process (1), the main controller 10 determines again, in step S51, whether or not a PI number has been input, with reference to the PI number flag. In this case, it is determined that a PI number has been input. Thus, the main controller 10 recognizes that the numeral keys are to be used for inputting an amount of money. The amount input process is then performed in step S15. In the amount input process, the PI number flag is cleared.

After this, the process is successively performed in the same manner as that shown in FIG. 7.

According to the fourth embodiment, an order in which a PI number and an amount of money are to be input is uniformly defined. Thus, even if neither the "PIN" key to be used for inputting a PI number nor the "AMOUNT" key to be used for inputting an amount of money are provided in the withdrawal transaction display screen, both a PI number and an amount of money can be input by use of only one set of numeral keys. Thus, the key arrangement in the withdrawal transaction display screen is further simplified.

An amount of money may be input before a PI number is input.

Figure 14:
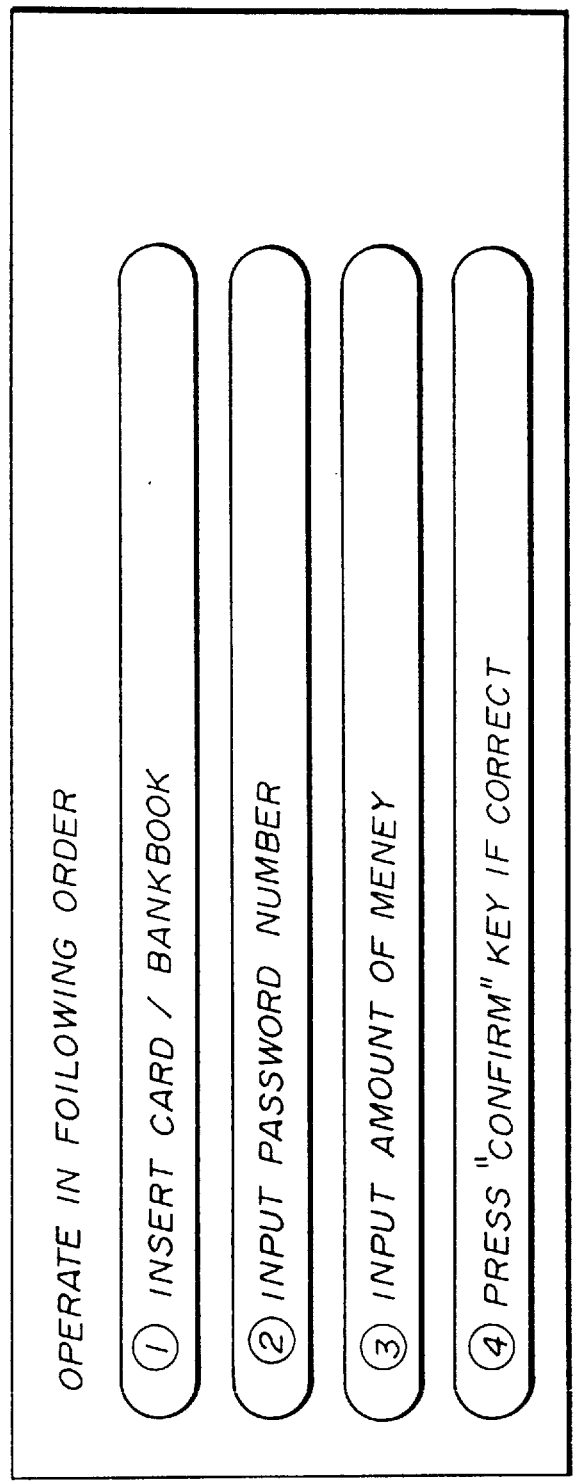
FIG. 14 is a diagram illustrating a screen display formed on the display unit in the processes shown in FIG. 13.

A description will now be given, with reference to FIGS. 13 and 14, of a fifth embodiment of the present invention. In the fifth embodiment, messages for all operations required for the withdrawal transaction are displayed on the message display area 100 in the withdrawal transaction display screen shown in FIG. 11. A message for an operation to be performed now is distinguished from other messages by color, blinking, a display form or the like.

When the "WITHDRAWAL" key in the transaction selecting display screen is touched by a user, the display screen is switched to the withdrawal transaction display screen, as shown in FIG. 11. Messages for all operations required for the withdrawal transaction are displayed on the message display area 100, as shown in FIG. 14. Referring to FIG. 14, the following messages are arranged in an order corresponding to an order in which operations are to be performed:

(1) INSERT CARD/BANKBOOK,
(2) INPUT PI NUMBER,
(3) INPUT AMOUNT OF MONEY, and
(4) PRESS "CONFIRM" KEY IF CORRECT.

In this state, the first message "INSERT CARD/BANKBOOK" is distinguished from other messages, for example, by its color. Thus, a user can easily recognize, from the display screen, that a card and/or a bankbook is to be inserted first.

When the above messages are displayed on the message display area 100 in the withdrawal transaction display screen, the first process (1) is performed. In the first process (1), if a bankbook is inserted, the bankbook process is performed in step S60; if a card is inserted, the card processing is performed in step S61; if the "CANCEL" key is operated, a canceling process is performed in step S62. The main controller then determines, in step S63, whether or not a card has been inserted. If it is determined that a card has not been inserted yet, a sixth process (6) is performed in step S64. In the sixth process (6), it is determined whether or not the first time and the second time have elapsed, in the same manner as in steps S17 and S19 shown in FIG. 2. When it is determined that the first and second times have elapsed, the withdrawal transaction is completed. On the other hand, when it is determined that the first and second times have not elapsed yet, the process returns to the start of the first process (1). The above steps are then repeated.

Even if a bankbook is not inserted, the withdrawal transaction can proceeded. If a bankbook is inserted, the amount of money paid out by the ATM and the balance in the bank account are, of course, printed on the bankbook.

If the "CANCEL" key is operated, the withdrawal transaction is completed in the same manner as in the case where it is determined that the first and second times have elapsed in the sixth process (6).

If the main controller 10 determines, in step S63, that a card has been inserted, the second process (2) is activated and the second message "INPUT PI NUMBER" is distinguished from other messages by, for example, its color. In this state, the ATM is waiting for a user to input a PI number. In the second process (2), if a PI number is input, the PI number input process is performed in step S65, and if the "CORRECT" key or the "CANCEL" key is operated, a correction/cancel process is performed in step S66. The main controller then determines, in step S67, whether or not a PI number has been input. If it is determined that a PI number has not been input, the sixth process (6) is performed in step S68 in the same manner as described above. If the first and second times have elapsed in the sixth process (6), the withdrawal transaction is completed without performing the subsequent steps. On the other hand, when it is determined that the first and second times have not elapsed, the process returns to the start of the second process (2) and the above steps are repeated. If the "CORRECT" key is operated, data which has been input is cleared and the process returns to the start of the second process (2). If the "CANCEL" key is operated, a process is performed in the same manner as in a case where it is determined, in the sixth process (6), that the first and second times have elapsed.

When it is determined, in step S67, that a PI number has been input, the third process (3) is activated and the third message "INPUT AMOUNT OF MONEY" is distinguished from other messages by, for example, its color. In this state, the ATM is waiting for a user to input an amount of money. In the third process (3), if an amount of money is input, the amount input process is performed in step S69, and if the "CORRECT" key or the "CANCEL" key is operated, the correction/cancel process is performed in step S70. The main controller then determines, in step 71, whether or not an amount of money has been input. If it is determined that an amount of money has not been input yet, the sixth process (6) is performed in step S72. When it is determined, in step S72, that the first and second times have elapsed, the withdrawal transaction is completed without executing the subsequent steps. On the other hand, if it is determined that the first and second times have not elapsed yet, the process returns to the start of the third process (3) and the above steps are repeated. If the "CORRECT" key is operated, data which have been input is cleared and the process returns to the start of the third process (3). If the "CANCEL" key is operated, a process is performed in the same manner as in a case where it is determined that the first and second times have elapsed in the sixth process (6), and the withdrawal transaction is completed.

When it is determined, in step S71, that an amount of money has been input, the fourth message "PRESS "CONFIRM" KEY IF CORRECT" is distinguished from other messages by its color, and the confirm/correction/cancel process is performed in step S73. The main controller 10 then determines, in step S74, whether or not the "CONFIRM" key has been operated. If the "CONFIRM" key has not been operated yet, the sixth process (6) is performed in step S75. In the sixth process (6), if it is determined that the first and second times have elapsed, or if the "CANCEL" key has been operated, the withdrawal transaction is completed. On the other hand, if it is determined, in the sixth process (6), that the "CORRECT" key has been operated, the process return to step S73.

If the main controller 10 determines, in step S74, that the "CORRECT" key has been operated, the communication process is performed in step S76. In the communication process, the PI number and the amount of money input by the user are transmitted from the ATM to the host computer. After this, it is determined, in step S77, whether or not the withdrawal transaction is possible. If impossible, a message indicating that the withdrawal transaction is impossible is displayed on the message display area 100 in the fifth process (5) (step S79). If possible, the withdrawal process is performed in step S78, so that the number of bills and the number of coins corresponding to the amount of money input by the user are ejected from the ATM.

According to the fifth embodiment, messages for all the operations required for the withdrawal transaction are displayed on the message display area 100 in the withdrawal transaction display screen. That is, the display screen is not switched every time an operation is performed. Thus, a user can smoothly perform operations required for the withdrawal transaction.

A message displayed on the message display area 100 may also be switched every time a corresponding operation is performed.

A description will now be given, with reference to FIGS. 15 and 16, of a sixth embodiment of the present invention.

Figure 16:
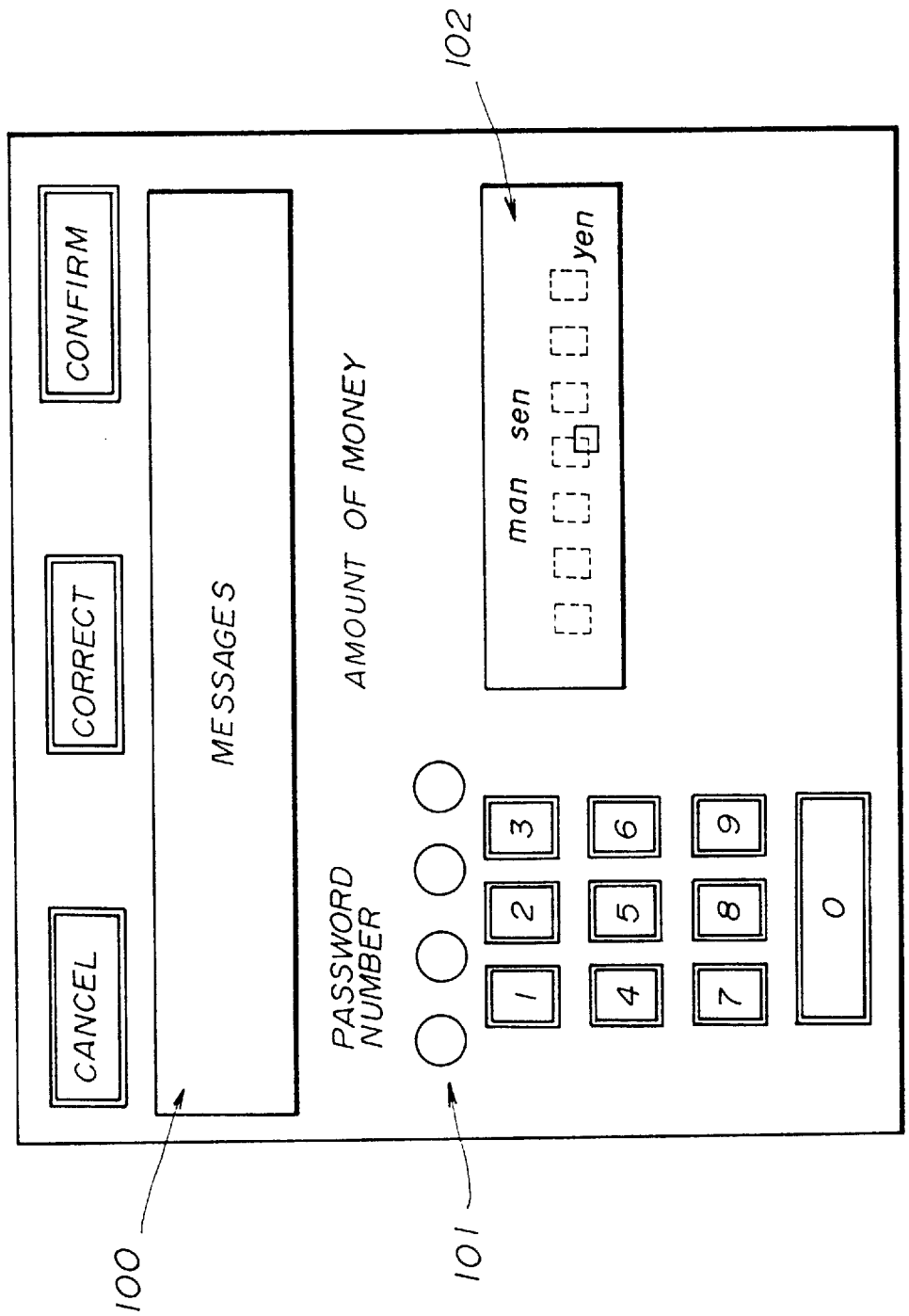
FIG. 16 is a diagram illustrating a receipt transaction screen display selected in the processes shown in FIG. 15.

When the "DEPOSIT" key in the transaction selecting display screen, as shown in FIG. 3, is operated, the display screen is switched to a deposit transaction display screen, as shown in FIG. 16. Referring to FIG. 16, the "CANCEL" key, the "CORRECT" key and the "CONFIRM" key are arranged in the deposit transaction display screen in the same manner as in the withdrawal transaction display screen described above. The message display area 100, the PIN display area 101 and the amount display area 102 are also formed in the deposit display screen, in the same manner as in the above withdrawal transaction display screen. One set of numeral keys "0" to "9" is positioned under the PIN display area 101. Four digits, input as a PI number by use of the set of numeral keys, are displayed on the PIN display area 101. An amount of money corresponding to the numbers of bills and coins input to the ATM is displayed on the amount display area 102.

Initially, messages for all operations required for executing the deposit transaction are displayed on the message display area 100 in the deposit transaction display screen. In this state, a user may perform the following operations required for the withdrawal transaction in an arbitrary order:

1) inserting a card and/or bankbook,
2) inputting a PI number, and
3) inputting cash (bills and/or coins).

Figure 15:
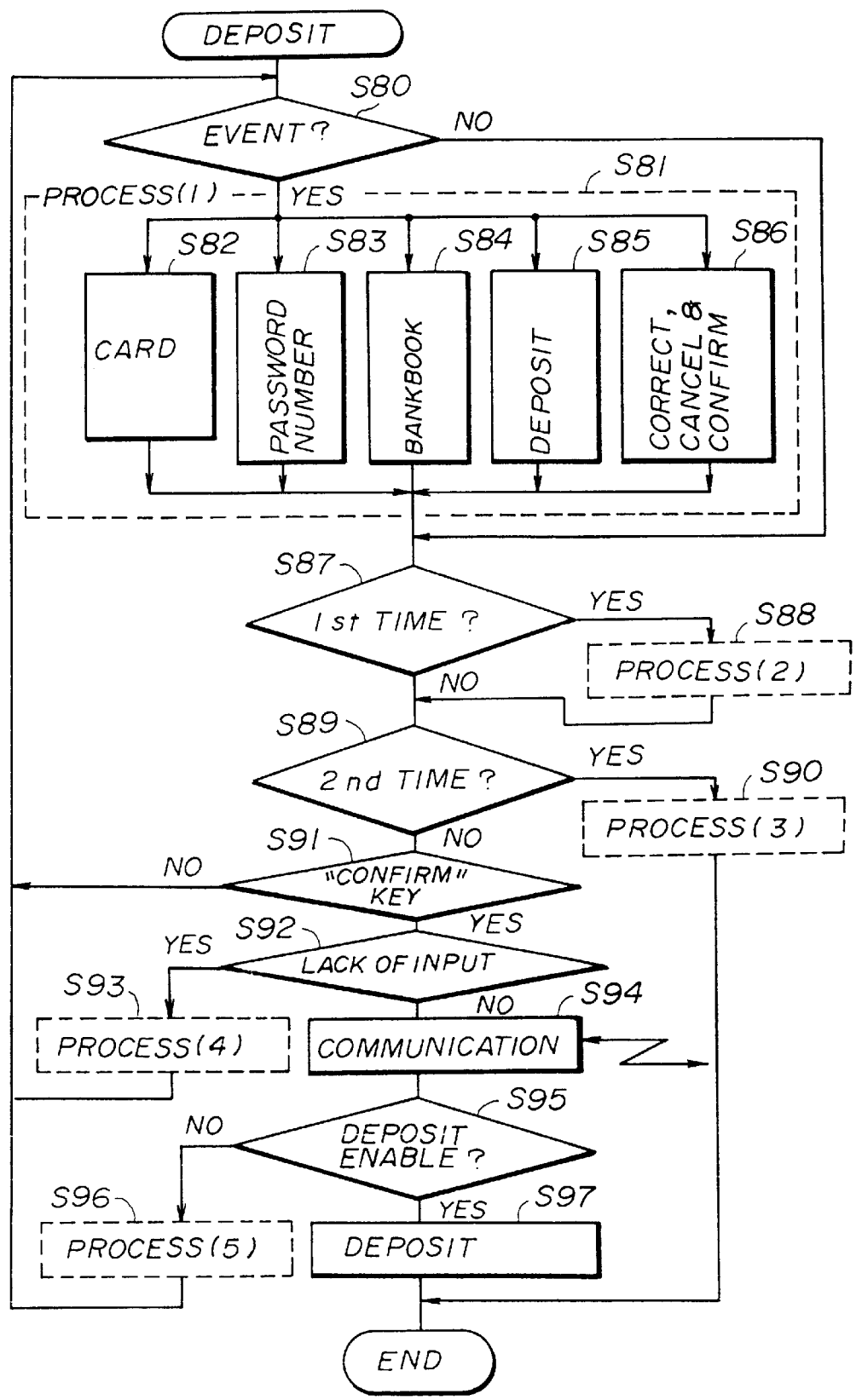
FIG. 15 is a flow chart illustrating processes to be executed in the ATM according to a sixth embodiment of the present invention.

When the deposit transaction display screen is formed on the color display unit 41, the main controller 10 starts to perform a process in accordance with a flow chart shown in FIG. 15. Referring to FIG. 15, the main controller 10 determines, in step S80, whether or not an event has occurred. An event occurs when the card processing unit 20 detects that a card has been inserted, or the bankbook processing unit 30 detects that a bankbook has been inserted, or cash is input into the input port, or when a key in the deposit transaction display screen, formed on the color display unit 41 is operated. When the main controller 10 detects that an event has occurred, a process corresponding to the type of event is performed in step S81 (in a first process (1)). If the card processing unit 20 detects that a card has been inserted, the card process is performed in step S82. In the card process, information recorded in a magnetic stripe of the card is read out therefrom. If it is determined that the numeral keys have been operated, a PI number input process is performed in step S83. In the PI number input process, four digits input by use of the numeral keys is input as a PI number to the ATM. If the bankbook processing unit 30 detects that a bankbook has been inserted, a bankbook process is performed in step S84. In the bankbook process, information recorded in a magnetic stripe formed on a bankbook is read out therefrom. If it is determined that cash has been input into the input port, a deposit process is performed in step S85. In the deposit process, a count of the cash input by the user is performed, and an amount of money is displayed on the amount display area 102. If one of the "CORRECT" key, the "CANCEL" key and the "CONFIRM" key is operated, a correct/cancel/confirm process is performed in step S86. That is, when the "CORRECT" key is operated, data which has already been input is cleared, and a predetermined message is displayed on the message display area 100 requesting the user to input a PI number. When the "CANCEL" key is operated, the card, the bankbook and the cash all of which have been supplied to the ATM are returned and the deposit transaction is completed. If the "CONFIRM" key is operated, the process proceeds as will described later. The "CONFIRM" key may become operable after a card and a PI number are input to the ATM.

On the other hand, when the main controller 10 determines, in step S80, that an event has not occurred yet, it is determined, in step S87, whether or not a first time has elapsed without a card being inserted and a PI number being input. That is, it is determined whether or not the first time has elapsed before operations corresponding to the messages are completed. When it is determined that the first time has elapsed, a second process (2) is performed in step S88. In the second process (2), supplemental messages regarding operations which have not been performed yet are displayed on the message display area 100. In a case where one of the numeral keys is operated and the first time has elapsed without a card being inserted, a supplemental message is displayed on the message display area 100 to urge the user to insert a card. Even if a card is inserted, but a bankbook is not inserted, the deposit transaction can be performed. Thus, even if a bankbook is not inserted, no supplemental message requesting the user to insert a bankbook is displayed on the message display area 100. If it is determined, in step S87, that the first time has not elapsed yet, or that the second process (2) in step S88 is completed, the main controller 10 determines, in step S89, whether or not a second time has elapsed without operating the "CONFIRM" key. In this state, if it is determined that the second time has elapsed, a third process (3) is performed in step S90. In the third process (3), the card, the bankbook and the cash, all of which have been supplied to the ATM, are ejected from the ATM. When the card, the bankbook and the cash are ejected from the ATM, the deposit transaction is completed. If it is determined, in step S89, that the second time has not elapsed yet, the main controller 10 determines, in step S91, whether or not the "CONFIRM" key has been operated. If the "CONFIRM" key has not been operated, the process returns to step S80 and the above steps are successively repeated.

When it is determined that the "CONFIRM" key has been operated, the main controller 10 determines, in step S92, whether or not there has been lack of operations for the deposit transaction. That is, in step S92, it is determined whether or not a card has been inserted, whether or not a PI number has been input, and whether or not the cash (the bills and the coins) has been input. When it is determined that there is a lack of operations for the deposit transaction, a fourth process (4) is performed in step S93. In the fourth process (4), when a card has not been inserted, when a PI number has not been input, or when the cash has not been input yet, messages corresponding to the lack of operations are displayed on the message display area 100 to urge the user to insert card, to input a PI number and to input the cash. If it is determined, in step S92, that there has been no lack of operations for the deposit transaction, a communication process is performed in step S94. In the communication process, information input by the user and information read out from the card and the bankbook are transmitted from the ATM to the host computer. The host computer checks propriety of this deposit transaction based on the information supplied from the ATM. The checking result is returned from the host computer to the ATM. The main controller 10 of the ATM determines, based on the result of the check supplied from the host computer, whether or not the deposit transaction can be performed in step S95. If the deposit transaction cannot be performed, a fifth process (5) is performed in step S96. In the fifth process (5), a message indicating that the deposit has been refused is displayed on the message display area 100. If the deposit refusal is caused by an erroneous PI number being input by the user, a message as shown in FIG. 5B is displayed on the message display area 100. After step S96, the process returns to step S80 and the process is performed in accordance with the above procedure. On the other hand, it is determined, in step S95, that the deposit transaction can be performed, a deposit process is performed in step S97. In the deposit process, the bankbook printer 32 of the bankbook processing unit 30 is driven so that the amount of the deposit and the amount of the balance in the bank account are printed on the bankbook inserted in the ATM. In addition, the printer 23 of the card processing unit 20 is driven so that a receipt and a journal are printed out. After this, the card and/or the bankbook are ejected, and then the withdrawal transaction is completed.

According to the sixth embodiment, the same advantages as those of the first embodiment can be obtained.

A description will now be given, with reference to FIGS. 17 and 18, of a seventh embodiment of the present invention.

When the "BALANCE" key on the transaction selecting display screen shown in FIG. 3 is operated, a balance inquiry display screen is formed on the color display unit 41 as shown in FIG. 18. In the balance inquiry display screen shown in FIG. 18, the "CANCEL" key, the "CORRECT" key, one set of numeral keys "0" to "9", the message display area 100, the PIN display area 101 and an illustration display area 103 are formed. Secondary messages, commercial messages and images and the like are displayed on the illustration display area 103.

Initially, messages requesting a user to insert a card and to input a PI number are displayed on the message display area 100. The user may perform operations corresponding to the message displayed on the message display area 100 in an arbitrary order. In the balance inquiry transaction, the main controller 10 performs a process in accordance with a flow chart as shown in FIG. 17.

Figure 17:
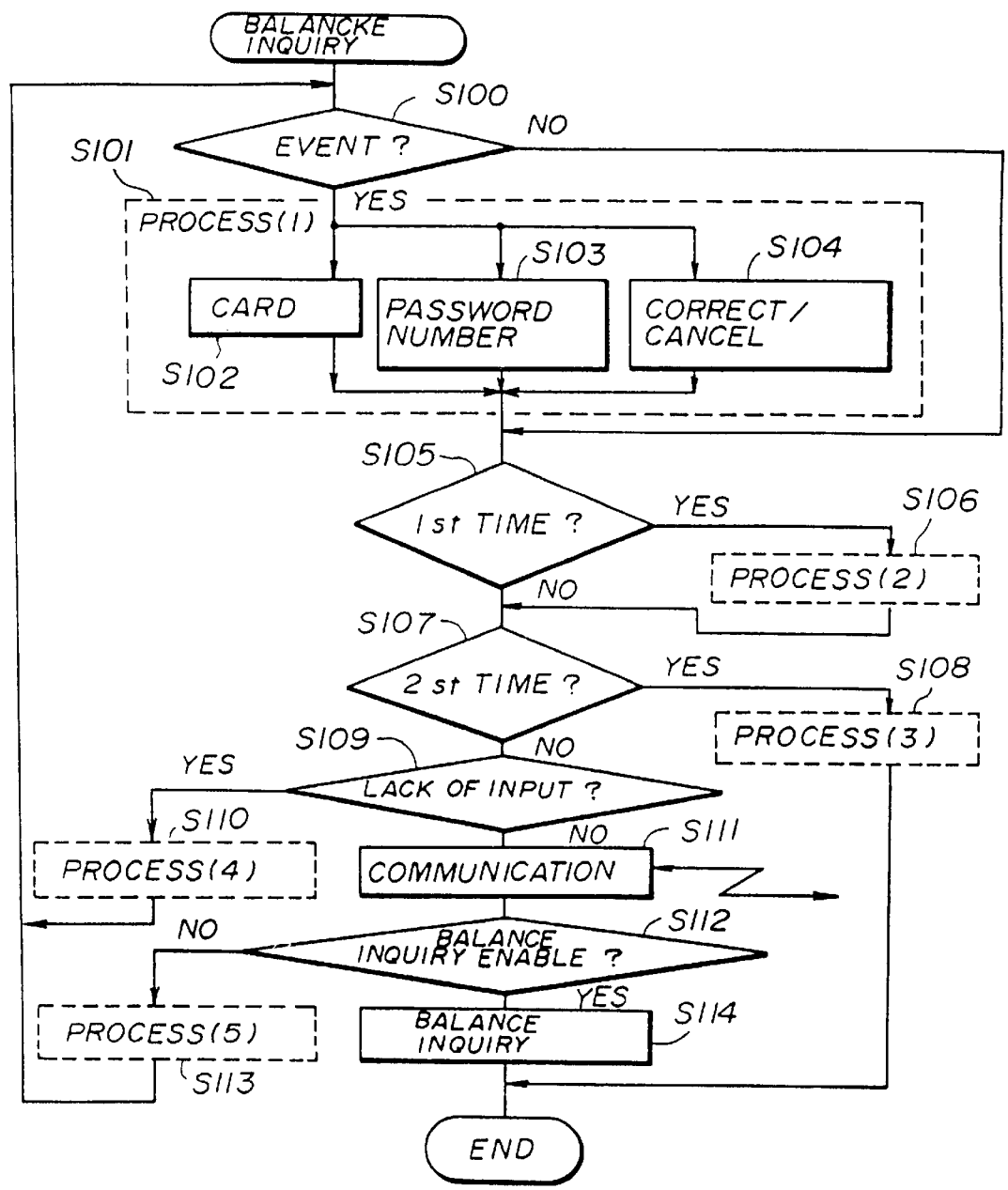
FIG. 17 is a flow chart illustrating processes to be executed in the ATM according to a seventh embodiment of the present invention.

Referring to FIG. 17, the main controller 10 determines, in step S100, whether or not an event has occurred. When the card processing unit 20 detects that a card has been inserted, or when numeral keys are operated, it is determined that an even has occurred. When it is determined that an event has occurred, a first process (1) is performed in step S101. In the first process (1), a process corresponding to a type of event is performed. That is, when the card processing unit 20 detects that a card has been inserted, the card process is performed in step S102. In the card process, information recorded in the magnetic stripe formed on the card is read out therefrom. If a numeral key operation is detected, a PI number input process is performed in step S103. In the PI number input process, four digits input by use of the numeral keys are recognized as a PI number. If the "CORRECT" key or the "CANCEL" key is operated, a correct/cancel process is performed in step S104. That is, if the "CORRECT" key is operated, digits input by the user are cleared and a message requesting the user to input a correct PI number is displayed on the message display area 100. If the "CANCEL" key is operated, the card which has been inserted is ejected and the balance inquiry transaction is completed.

On the other hand, when the main controller determines, in step S100, that an event has not occurred yet, the first process (1) in step S101 is skipped. It is then determined, in step S105, whether or not a first time has elapsed without operations corresponding to the message displayed on the message display area 100. Here, it is determined that the first time has elapsed, a second process (2) is performed in step S106. In the second process (2), supplemental messages corresponding to operations which has not been performed yet are displayed on the message display area 100. In a case where the numeral keys are operated to input a PI number and the first time has elapsed without a card being inserted, a supplemental message is displayed on the message display area 100 requesting the user to insert a card. When it is determined, in step S105, that the first time has not elapsed yet, or when the second process (2) in step S106 is completed, the main controller 10 determines, in step S107, whether or not a second time has elapsed. When it is determined that the second time has elapsed, a third process is performed in step S108. In the third process (3), a card which has been inserted by the user is ejected. When the card is ejected, the balance inquiry transaction is completed. On the other hand, when it is determined, in step S107, that the second time has not elapsed yet, the main controller 10 determines, in step S109, whether or not there has been lack of operations for the balance inquiry transaction. That is, in step S109, it is determined whether or not a card has been inserted, and whether or not a PI number has been input. When it is determined that there has been lack of operations for the deposit transaction, a fourth process (4) is performed in step Silo. In the fourth process (4), when a card has not been inserted, or when a PI number has not been input, messages corresponding to the lack of operations are displayed on the message display area 100 requesting the user to insert card or to input a PI number. If it is determined, in step S109, that there has been no lack of operations for the balance inquiry transaction, a communication process is performed in step S111. In the communication process, the PI number input by the user and information read out from the card are transmitted from the ATM to the host computer. The host computer checks propriety of this balance inquiry transaction based on the information supplied from the ATM. The checking result is returned from the host computer to the ATM. The main controller 10 of the ATM determines, based on the result of the check supplied from the host computer, in step S112, whether or not the balance inquiry transaction can be performed. If it is determined that the balance inquiry transaction cannot be performed, a fifth process (5) is performed in step S113. In the fifth process (5), a message indicating that the balance inquiry has been refused is displayed on the message display area 100. If the refusal of the balance inquiry is caused by an erroneous PI number being input by the user, a message as shown in FIG. 5B is displayed on the message display area 100. After step S113, the process returns to step S100 and the process is performed in accordance with the above procedure.

On the other hand, if it is determined, in step S112, that the balance inquiry transaction can be performed, a balance inquiry process is performed in step S114. In the balance inquiry process, the printer 23 of the card processing unit 20 is driven so that a journal indicating an amount of the balance in the bank account is printed. After this, the card is ejected, and then the balance inquiry transaction is completed.

In the above seventh embodiment, various keys are arranged at fixed positions in the balance inquiry display screen, which is not switched until the balance inquiry transaction is completed. In addition, the messages regarding all the operations required for the balance inquiry transaction are displayed at the same time on the message display area 100 in the balance inquiry display screen. As a result, the seventh embodiment has the same advantages as those of the first embodiment.

A description will now be given, with reference to FIG. 19, of an eighth embodiment of the present invention.

When the "TRANSFER I" key in the transaction selecting display screen shown in FIG. 3 is operated, the display screen is switched to a transfer transaction display screen having the same form as the withdrawal transaction display screen shown in FIG. 4. Messages regarding the following operations are initially displayed on the message display area 100 in the transfer transaction display screen:

(1) inserting a card, (2) inputting a PI number, (3) inputting cash, (4) inserting a paper card, (5) inputting an amount of money.

The operations may be performed in an arbitrary order. The paper card is a card having a magnetic stripe in which information regarding an account to which money is to be transferred, a recipient, a customer (a user) and the like is recorded. The customer may perform an arbitrary operation among the insertion of a card, the input of cash, the insertion of a paper card and the input of an amount of transfer money.

In a state where the transfer transaction display screen as shown in FIG. 4 is formed on the color display unit 41, the main controller 10 performs a process in accordance with a flow chart as shown in FIG. 19. Referring to FIG. 19, the main controller 10 determines, in step 120, whether or not an event has occurred. When the card processing unit 20 detects that a card or a paper card has been inserted, that cash has been input into the input port, or that a numeral key has been operated, it is determined that an event has occurred. When the main controller 10 determines that an event has occurred, a first process (1) is performed in step S121. In the first step (1), a process corresponding to a type of event is performed. That is, when a card is inserted into the card processing unit 20 or when cash is input to the input port, it is determined, in step S122, whether or not cash has been inserted. When it is determined that a card has been inserted, a card process is performed in step S123. In the card process, information recorded in a magnetic stripe formed on the card is read. Due to the insertion of the card, the main controller 10 recognizes that the transfer transaction from a first account to a second account is to be performed. In this case, the following process is performed.

A message requesting the customer (the user) to input a PI number is displayed on the message display area 100, and the customer inputs a PI number by the operation of the first set of numeral keys shown in FIG. 4. The main controller 10 performs a PI number input process in step S124 in response to the input of the PI number. On the other hand, if it is determined, in step S122, that a card has not been inserted, the main controller 10 recognizes that cash has been input to the input port and performs a cash input process in step S125. In the cash input process, an amount of money of the cash input thereto is counted by the bill processing unit 60 and/or the coin processing unit 70. When it is detected that the paper card has been inserted, a paper card process is performed in step 126. In the paper card process, information regarding an account to which the money is to be transferred is read out from the magnetic stripe on the paper card. The account number of the account is displayed on the message display area 100, in step S127. When the operation of a numeral key in the first set of numeral keys is detected, an amount input process is performed in step S128. In the amount input process, digit numbers corresponding to numeral keys operated by the customer are input to the ATM. When the "YEN" key is operated, the amount input process is completed, and the amount of money corresponding to the digit numbers input by the customer is displayed on the amount display area 102 in the transfer transaction display screen. When the "CORRECT" key, the "CANCEL" key or the "CONFIRM" key is operated, a correct/cancel/confirm process is performed in step S129. That is, when the operating of the "CORRECT" key is detected, input digit numbers are cleared and predetermined messages are displayed requesting the customer to input a PI number and a amount of money to be transferred to an account again on the message display area 100. When the operating of the "CANCEL" key is detected, the card, the cash and the paper card are ejected from the ATM and the transfer transaction is completed. When the operating of the "CONFIRM" key is detected, a predetermined process is performed as will be described later.

On the other hand, when it is determined, in step S120, that an event has not occurred yet, the first process (1) described above is skipped. The main controller then determines, in step S130, whether or not a first time has elapsed without operations required for the transfer transaction. When it is determined that the first time has elapsed, a second process (2) is performed in step S131. In the second step (2), supplemental messages, regarding operation which have not been performed yet, are displayed on the message display area 100. When the main controller 10 determines, in step S130, that the first time has not elapsed yet, or when the second process (2) in step S131 is completed, the main controller 10 determines, in step S132, whether or not a second time has elapsed. When it is determined that the second time has elapsed, a third process (3) is performed in step S133. In the third process (3), the card, the paper card and the cash all of which are input to the ATM are ejected. When the third process (3) is completed, the whole transfer transaction is completed. On the other hand, it is determined, in step S132, that the second time has not elapsed yet, the main controller 10 determines, in step S134, whether or not the "CONFIRM" key has been operated. When the "CONFIRM" key has not been operated yet, the process returns to step S120, and the above steps are successively repeated. On the other hand, when the "CONFIRM" key has been operated, the main controller 10 determines, in step S135, whether or not there has been lack of operations for the balance inquiry transaction. That is, in step S135, it is determined whether or not a card has been inserted, whether or not the cash has been input, whether or not a PI number has been input and whether or not an amount of money has been input. When it is determined that there has been lack of operations for the transfer transaction, a fourth process (4) is performed in step S136. In the fourth process (4), when a card has not been inserted, or the cash has not been input, or a PI number and the amount of money have not been input, messages corresponding to the lack of operations are displayed on the message display area 100 requesting the customer to insert a card, to input a PI number or to input an amount of money. If it is determined, in step S135, that there has been no lack of operations for the transfer transaction, a communication process is performed in step S137. In the communication process, information which has been input by the customer and information read out from the card and/or the paper card are transmitted from the ATM to the host computer. The host computer checks propriety of this transfer transaction based on the information supplied from the ATM. The result of this check is returned from the host computer to the ATM. The main controller 10 of the ATM determines, based on the result of the check supplied from the host computer, in step S138, whether or not the transfer transaction can be performed. If it is determined that the transfer transaction cannot be performed, a fifth process (5) is performed in step S139. In the fifth process (5), a message indicating that the transfer has been refused is displayed on the message display area 100. After this, the process returns to step S120, and the process is performed in accordance with the above procedure.

On the other hand, if it is determined, in step S138, that the transfer transaction can be performed, a transfer process is performed in step S140. In the transfer process, information regarding the transfer is transmitted to the host computer. The host computer performs a process for transferring an amount of money to an account in a bank based on the information regarding the transfer. The printer 23 of the card processing unit 20 is driven so that a journal indicating the amount of the balance in the bank account is printed. In addition, the bills processing unit 60 and/or the coin processing unit 70 are driven so that change is ejected from the ATM. After this, the card and the paper card are ejected, and then the transfer transaction is completed.

In the eighth embodiment, the transfer transaction is performed where the transfer transaction display screen is formed on the color display unit 41 as shown in FIG. 4. Thus, the eighth embodiment has the same advantages as the first embodiment described above.

The present invention is not limited to the aforementioned embodiments, and variations and modifications may be made without departing from the scope of the claimed invention.

What is claimed is:

1. An interactive I/O terminal for supplying information to a user and for receiving information input by the user to prepare a transaction, requiring a plurality of operations, for approval and processing by a remote host system which requires the results of the operations to so approve and process, said interactive I/O terminal comprising a plurality of processing units, each processing unit adapted to perform one of the operations required by the transaction based on information input by the user;

an I/O display panel for displaying a predetermined screen having a display area on which messages are to be displayed and a plurality of operation keys which are operated by the user to input information used by said plurality of processing units, said I/O display panel outputting signals corresponding to the operation keys operated by the user to the plurality of processing units;

first control means, coupled to said I/O display panel, for controlling said I/O display panel so that a plurality of messages corresponding to the plurality of operations are concurrently displayed on the display area in said screen formed on said I/O display panel;

second control means, coupled to said I/O display panel, for controlling said I/O display panel so that said screen is maintained on said I/O display panel until the user has input information using said operation keys in accordance with said plurality of messages displayed on the display area, said plurality of processing units operating independently and outputting results in accordance with information corresponding to signals output from said I/O display panel in response to the operations of said operation keys by the user;

communication means, coupled to said plurality of processing units, for transmitting at one time all of the results outputted by said plurality of processing units to the host system and for receiving a response from the host system; and processing means, for completing the operation in accordance with the response received by said communication means.

2. The interactive I/O terminal as claimed in claim 1, wherein said first control means controls said I/O display panel so that a plurality of messages are simultaneously displayed.

3. The interactive I/O terminal as claimed in claim 1, wherein said plurality of processing units permit the user to perform operations in an arbitrary order.

4. The interactive I/O terminal as claimed in claim 3, wherein said plurality of processing units concurrently operate in accordance with the operations performed by the user in an arbitrary order.

5. The interactive I/O terminal claimed in claim 2, wherein said first control means has means for displaying the messages so that a message corresponding to an operation which needs to be performed is distinguished from a message corresponding to an operation which has been performed.

6. The interactive I/O terminal as claimed in claim 1, wherein each of said Plurality of processing units operates every time a corresponding operation is performed by the user.

7. The interactive I/O terminal claimed in claim 6, wherein said first control means has means for displaying the messages so that a message corresponding to an operation which needs to be performed is distinguished from a message corresponding to an operation which has been performed.

8. An ATM having interactive I/O terminal for supplying a user with information regarding operations required for a banking transaction and for receiving information from the user to prepare one or more banking transactions in conjunction with a remote host system which approves and processes the transaction based on the results of the operations, said ATM comprising:

a plurality of processing units operating in accordance with input information, said plurality of processing units including a card processing unit for obtaining information from a card for the banking transaction;

a card input unit for receiving the card supplied by the user;

an I/O display panel for displaying a predetermined screen having a first display area on which messages are to be displayed and operation keys and for outputting signals corresponding to operation keys operated by the user;

first control means, coupled to said I/O display panel, for controlling said I/O display panel so that a plurality of messages regarding operations required for the banking transaction are all displayed at the same time on the first display area in said screen formed on said I/O display panel;

second control means, coupled to said I/O display panel, for controlling said I/O display panel so that said screen is maintained on said I/O display panel until the user has operated said operation keys and inputted the card into said card input unit in accordance with said each of plurality of messages, said plurality of processing units operating independently and outputting results in accordance with information corresponding to signals output from said I/O display panel in response to the operations of said operation keys and said card processing unit obtaining the information from the card received by said card input unit;

communication means, coupled to said plurality of processing units, for transmitting all at one time all of the results outputted by said plurality of processing units and the information obtained from the card to the host system and for receiving a response from the host system; and processing means for performing a banking transaction process in accordance with the response received from the host system by said communication means.

9. The interactive I/O terminal as claimed in claim 8, wherein said first control means controls said I/O display panel so that all the messages corresponding to the operations required for the banking transaction are simultaneously displayed.

10. The interactive I/O terminal as claimed in claim 9, wherein said plurality of processing units permit the user to supply the card to said card input unit and to perform operations of the input keys in the screen in an arbitrary order.

11. The interactive I/O terminal as claimed in claim 10, wherein said plurality of processing units concurrently operates in accordance with the operation performed by the user in an arbitrary order.

12. The interactive I/O terminal claimed in claim 9, wherein said first control means has means for displaying the messages so that a message corresponding to an operation which needs to be performed is distinguished from a message corresponding to an operation which has been performed.

13. The interactive I/O terminal as claimed in claim 9, wherein each of said plurality of processing units operates every time a corresponding operation is performed by the user.

14. The interactive I/O terminal claimed in claim 13, wherein said first control means has means for displaying the messages so that a message corresponding to an operation which needs to be performed is distinguished from a message corresponding to an operation which has been performed.

15. The interactive I/O terminal claimed in claim 8, wherein said input keys formed in the screen include one set of numeral keys, said one set of numeral keys being used for a plurality of kinds of operations, and wherein said processing means has recognizing means for recognizing that said one set of numeral keys is to be used for an operation from among said plurality of kinds of operations.

16. The interactive I/O terminal claimed in claim 15, wherein an order in which operations are to be performed by the user is fixed to complete the banking transaction, and wherein said recognizing means recognizes, based on the order, that said one set of numeral keys is to be used for an operation from among said plurality of kinds of operations.

17. The interactive I/O terminal as claimed in claim 15, wherein said input keys in the screen further include operation identifying keys each of which is used for identifying an operation in which said one set of numeral keys is to be used, and wherein said recognizing means recognizes, based on an operation identifying key operated by the user, that said one set of numeral keys is to be used for a corresponding operation from among said plurality of kinds of operations.

18. The interactive I/O terminal as claimed in claim 8, wherein said plurality of processing units includes a bankbook processing unit for reading information from a bankbook and wherein said interactive I/O terminal further comprises a bankbook input unit for receiving the bankbook supplied by the user.

19. The interactive I/O terminal claimed in claim 8, wherein the messages displayed in the first display area include a card message for inducing the user to provide a card to said interactive I/O terminal, the card message being located at a head position of the messages arranged in a predetermined order.

20. An ATM including interactive I/O terminal for supplying information to a user and for receiving information input by the user to perform a transaction having a plurality of operations in conjunction with a remote host system, each operation requiring information from a user and verification from the remote host system, said ATM comprising:

a plurality of processing units, each processing unit having an assigned operation to process in accordance with the information input by the user regarding the corresponding operation;

an I/O display panel for displaying a predetermined screen having a display area on which prompts, requesting information related to each operation, and a plurality of touch sensitive operation keys for receiving the information from the user are displayed, said I/O display panel outputting signals corresponding to the operation keys operated by the user;

first control means, coupled to said I/O display panel, for controlling said I/O display panel so that each of the messages are concurrently displayed on the display area in said screen formed on said I/O display panel;

second control means, coupled to said I/O display panel, for controlling said I/O display panel so that said screen is maintained on said i/O display panel until all requested information corresponding to each of the messages displayed on the display area has been input using said operation keys;

communication means, coupled to said plurality of processing units, for collectively transmitting all at one same time all of the results outputted by said plurality of processing units to the host system and for receiving a response from the host system; and processing means for performing a process in accordance with the response received by said communication means.

21. An ATM having an interactive I/O terminal for performing a banking transaction having a plurality of operations, each operation having associated input information and for receiving information from the user to perform the banking transaction in conjunction with a remote host system which verifies the banking transaction in accordance with the results of the operations, said ATM comprising:

a plurality of processing units, each processing unit having an assigned operation from among the plurality of operations to process in accordance with information input by the user, one of said plurality of processing units being a card processing unit for performing an operation of obtaining information from a card for the banking transaction;

a card input unit for receiving the card supplied from the user;

an I/O display panel for displaying a plurality of messages requesting the input information for each operation on a predetermined screen having touch sensitive operation keys for the user to enter the input information and for outputting signals corresponding to operation keys operated by the user;

first control means, coupled to said I/O display panel, for controlling said I/O display panel so that the plurality of messages regarding operations required for the banking transaction are concurrently displayed on said screen formed on said I/O display panel;

second control means, coupled to said I/O display panel, for controlling said I/O display panel so that said screen is maintained on said I/O display panel until all operations of said operation keys required for the banking transaction are completed and the card has been received by said card input unit;

communication means, coupled to said plurality of processing units, for collectively transmitting all at one time all of the results obtained by said plurality of processing units and the information obtained from the card to the host system for receiving a response from the host system; and processing means for performing a banking transaction process in accordance with the response received by said communication means.

22. An ATM which performs a banking transaction in cooperation with a host, the ATM comprising:

a card processor which receives a user's card and reads and writes data on the user's card;

an input unit which receives input from the user regarding the banking transaction;

a display unit which displays information including prompts for data input from the user; and a main controller which:

causes said display unit to concurrently display, when a specific banking transaction is requested by a user, all the prompts required to complete the specific transaction including a prompt to insert the user's card, a prompt for the user to enter a password associated with the user's card, and, if appropriate, an amount related to the specific transaction;

causes said card processing unit to process the user's card when input;

causes said input unit to receive the user's responses to the displayed prompts when entered; and upon completion of the processing of the user's card by the card processor and receipt of the user's responses to all of the concurrently displayed prompts initiates communication with the host to perform the banking transaction.

* * * * *